(12) United States Patent
Reid et al.

(10) Patent No.: US 12,480,063 B2
(45) Date of Patent: *Nov. 25, 2025

(54) FUEL COMPOSITIONS

(71) Applicant: INNOSPEC LIMITED, Ellesmere (GB)

(72) Inventors: Jacqueline Reid, Ellesmere (GB); Nigel John Broom, Ellesmere (GB); Adele Cross, Ellesmere (GB); Martin Roberts, Ellesmere (GB); Alan Ross, Ellesmere (GB)

(73) Assignee: INNOSPEC LIMITED, Port Cheshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/718,232

(22) PCT Filed: Dec. 14, 2022

(86) PCT No.: PCT/GB2022/053214
§ 371 (c)(1),
(2) Date: Jun. 10, 2024

(87) PCT Pub. No.: WO2023/111549
PCT Pub. Date: Jun. 22, 2023

(65) Prior Publication Data
US 2025/0043203 A1 Feb. 6, 2025

(30) Foreign Application Priority Data
Dec. 14, 2021 (GB) ..................... 2118107

(51) Int. Cl.
C10L 1/222 (2006.01)
C10L 1/196 (2006.01)
C10L 1/238 (2006.01)
C10L 10/06 (2006.01)

(52) U.S. Cl.
CPC ............ *C10L 1/2222* (2013.01); *C10L 1/1966* (2013.01); *C10L 1/238* (2013.01); *C10L 10/06* (2013.01); *C10L 2200/0446* (2013.01); *C10L 2270/026* (2013.01)

(58) Field of Classification Search
CPC ...... C10L 1/2222; C10L 1/1966; C10L 1/238; C10L 10/06; C10L 2270/026; C10L 2200/0446
See application file for complete search history.

(56) References Cited

U.S. PATENT DOCUMENTS

| | | | |
|---|---|---|---|
| 2,488,612 A | 11/1949 | Tunick | |
| 3,172,892 A | 3/1965 | Le Suer et al. | |
| 3,219,666 A | 11/1965 | Norman et al. | |
| 3,272,746 A | 9/1966 | Le Suer et al. | |
| 3,275,554 A | 9/1966 | Hendrik | |
| 3,310,402 A | 3/1967 | Jan et al. | |
| 3,310,492 A | 3/1967 | Benoit | |
| 3,341,542 A | 9/1967 | Le Suer et al. | |
| 3,438,757 A | 4/1969 | Honnen et al. | |
| 3,444,170 A | 5/1969 | Norman et al. | |
| 3,454,555 A | 7/1969 | Van Der Voort et al. | |
| 3,455,831 A | 7/1969 | Davis | |
| 3,455,832 A | 7/1969 | Davis | |
| 3,565,804 A | 2/1971 | Honnen et al. | |
| 3,576,743 A | 4/1971 | Widmer et al. | |
| 3,630,904 A | 12/1971 | Musser et al. | |
| 3,632,511 A | 1/1972 | Liao | |
| 3,755,433 A | 8/1973 | Miller et al. | |
| 3,804,763 A | 4/1974 | Meinhardt | |
| 3,822,209 A | 7/1974 | Knapp et al. | |
| 4,234,435 A | 11/1980 | Meinhardt et al. | |
| 4,288,612 A | 9/1981 | Lewis et al. | |
| 4,617,026 A | 10/1986 | Shaub et al. | |
| 4,877,416 A | 10/1989 | Campbell | |
| 5,089,029 A | 2/1992 | Hashimoto et al. | |
| 5,112,364 A | 5/1992 | Rath et al. | |
| 5,634,951 A | 6/1997 | Colucci et al. | |
| 5,725,612 A | 3/1998 | Malfer et al. | |

(Continued)

FOREIGN PATENT DOCUMENTS

EP 0244616 A2 11/1987
EP 0310875 A1 4/1989

(Continued)

OTHER PUBLICATIONS

International Search Report (ISR) issued for PCT/GB2022/053214, dated Mar. 24, 2023 (3 pages).
Written Opinion (WO) issued for PCT/GB2022/053214, dated Mar. 24, 2023 (6 pages).
International Search Report (ISR) issued for PCT/GB2022/053216, dated Mar. 16, 2023 (3 pages).
Written Opinion (WO) issued for PCT/GB2022/053216, dated Mar. 16, 2023 (3 pages).
International Search Report (ISR) issued for PCT/GB2022/053218, dated Mar. 22, 2023 (3 pages).
Written Opinion (WO) issued for PCT/GB2022/053218, dated Mar. 22, 2023 (6 pages).
International Search Report (ISR) issued for PCT/GB2022/053217, dated Mar. 22, 2023 (3 pages).
Written Opinion (WO) issued for PCT/GB2022/053217, dated Mar. 22, 2023 (6 pages).

(Continued)

*Primary Examiner* — Vishal V Vasisth
(74) *Attorney, Agent, or Firm* — Jason A. Smith; Shumaker, Loop & Kendrick, LLP

(57) ABSTRACT

A method of cleaning up internal diesel injector deposits in a severely fouled engine, the method including combusting in the engine a diesel fuel composition having (a) a quaternary ammonium salt additive; and (b) one or more further nitrogen-containing detergents; in which the quaternary ammonium salt additive includes the quaternised reaction product of a hydrocarbyl substituted succinic acid derived acylating agent and a compound able to react with said acylating agent and which includes a tertiary amine group; in which each molecule of the hydrocarbyl substituted succinic acid derived acylating agent includes on average at least 1.2 succinic acid moieties.

16 Claims, 2 Drawing Sheets

(56) References Cited

U.S. PATENT DOCUMENTS

| | | | |
|---|---|---|---|
| 5,876,468 A | 3/1999 | Moreton | |
| 5,925,151 A | 7/1999 | Decanio et al. | |
| 6,217,624 B1 | 4/2001 | Morris et al. | |
| 6,800,103 B2 | 10/2004 | Malfer et al. | |
| 6,821,307 B2 | 11/2004 | Caprotti et al. | |
| 6,866,690 B2 | 3/2005 | Aradi et al. | |
| 7,291,758 B2 | 11/2007 | Bohnenpoll et al. | |
| 8,444,720 B2 | 5/2013 | Colucci et al. | |
| 9,062,265 B2 | 6/2015 | Reid et al. | |
| 10,150,927 B2 | 12/2018 | Mezger et al. | |
| 10,457,884 B2 | 10/2019 | Russo et al. | |
| 11,085,001 B2 | 8/2021 | Castro et al. | |
| 2007/0094922 A1 | 5/2007 | Bergemann | |
| 2009/0282731 A1 | 11/2009 | Malfer et al. | |
| 2012/0010112 A1 | 1/2012 | Grabarse et al. | |
| 2013/0031828 A1 | 2/2013 | Reid et al. | |
| 2013/0133245 A1 | 5/2013 | Röger-Göpfert et al. | |
| 2014/0100759 A1* | 4/2014 | Lee | F02D 41/3845 701/103 |
| 2014/0157656 A1* | 6/2014 | Reid | C10L 1/238 44/353 |
| 2014/0157657 A1* | 6/2014 | Reid | C10L 1/238 123/1 A |
| 2015/0337227 A1* | 11/2015 | Reid | C10L 10/06 44/331 |
| 2017/0121622 A1 | 5/2017 | Burgess et al. | |
| 2017/0121628 A1 | 5/2017 | Moreton et al. | |
| 2017/0130153 A1 | 5/2017 | Peretolchin et al. | |
| 2018/0187115 A1* | 7/2018 | Reid | C10L 1/2383 |
| 2019/0153348 A1 | 5/2019 | Arters et al. | |
| 2019/0249099 A1 | 8/2019 | Peretolchin et al. | |
| 2020/0056109 A1 | 2/2020 | Peretolchin et al. | |
| 2020/0157445 A1 | 5/2020 | Ross et al. | |
| 2020/0354642 A1* | 11/2020 | Reid | C10L 10/04 |
| 2021/0115347 A1 | 4/2021 | Mulqueen et al. | |

FOREIGN PATENT DOCUMENTS

| | | |
|---|---|---|
| EP | 0356725 A1 | 3/1990 |
| EP | 0565285 B1 | 5/1997 |
| EP | 0700985 B1 | 3/1999 |
| EP | 1250404 A1 | 10/2002 |
| EP | 1295933 A2 | 3/2003 |
| EP | 0870819 B1 | 3/2004 |
| EP | 1226188 B1 | 12/2004 |
| EP | 1254889 B1 | 6/2007 |
| EP | 1229100 B1 | 12/2010 |
| EP | 2631283 B1 | 10/2018 |
| EP | 3609990 A1 | 2/2020 |
| GB | 2493377 A | 2/2013 |
| GB | 2518288 A | 3/2015 |
| GB | 2520795 B | 4/2018 |
| GB | 2564511 A | 1/2019 |
| GB | 2564735 A | 1/2019 |
| GB | 2564736 A | 1/2019 |
| GB | 2546350 B | 12/2019 |
| GB | 2578519 A | 5/2020 |
| WO | 2001072930 A2 | 10/2001 |
| WO | 2007015080 A1 | 2/2007 |
| WO | 2009040582 A1 | 4/2009 |
| WO | 2009040583 A1 | 4/2009 |
| WO | 2011095819 A1 | 8/2011 |
| WO | 2011110860 A1 | 9/2011 |
| WO | 2011141731 A1 | 11/2011 |
| WO | 2013017886 A1 | 2/2013 |
| WO | 2013017887 A1 | 2/2013 |
| WO | 2013017889 A1 | 2/2013 |
| WO | 2015011505 A1 | 1/2015 |
| WO | 2018007486 A1 | 1/2018 |
| WO | 2018178674 A1 | 10/2018 |
| WO | 2018178678 A1 | 10/2018 |
| WO | 2018178680 A1 | 10/2018 |
| WO | 2018178687 A1 | 10/2018 |
| WO | 2018178695 A1 | 10/2018 |
| WO | 2019186125 A1 | 10/2019 |
| WO | 2021090020 A1 | 5/2021 |
| WO | 2021090021 A1 | 5/2021 |
| WO | 2023111550 A1 | 6/2023 |
| WO | 2023111551 A1 | 6/2023 |
| WO | 2023111552 A1 | 6/2023 |

OTHER PUBLICATIONS

Search Report issued for GB2118107.8, dated May 12, 2022 (1 page).
Search Report issued for GB2118104.5, dated May 12, 2022 (1 page).
Search Report issued for GB2188103.7, dated May 12, 2022 (2 pages).
Search Report issued for GB2118100.3, dated May 11, 2022 (2 pages).
Combined Search and Examination Report issued for GB22188130.0, dated Jun. 1, 2023 (2 pages).
Combined Search and Examination Report issued for GB2218812.2, dated Jun. 2, 2023 (3 pages).
Combined Search and Examination Report issued for GB2218811.4, dated May 26, 2023 (3 pages).
Combined Search and Examination Report issued for GB2218810.6, dated May 25, 2023 (2 pages).

* cited by examiner

FUEL COMPOSITIONS

This application is a 371 of PCT/GB2022/053214 filed Dec. 14, 2022

TECHNICAL FIELD AND BACKGROUND

The present invention relates to methods and uses for improving the performance of diesel engines using fuel additives. In particular the invention relates to additives for diesel fuel compositions for use in diesel engines with high pressure fuel systems.

Due to consumer demand and legislation, diesel engines have in recent years become much more energy efficient, show improved performance and have reduced emissions.

These improvements in performance and emissions have been brought about by improvements in the combustion process. To achieve the fuel atomisation necessary for this improved combustion, fuel injection equipment has been developed which uses higher injection pressures and reduced fuel injector nozzle hole diameters. The fuel pressure at the injection nozzle is now commonly in excess of 1500 bar ($1.5 \times 10^8$ Pa). To achieve these pressures the work that must be done on the fuel also increases the temperature of the fuel. These high pressures and temperatures can cause degradation of the fuel. Furthermore, the timing, quantity and control of fuel injection has become increasingly precise. This precise fuel metering must be maintained to achieve optimal performance.

Diesel engines having high pressure fuel systems can include but are not limited to heavy duty diesel engines and smaller passenger car type diesel engines. Heavy duty diesel engines can include very powerful engines such as the MTU series 4000 diesel having 20 cylinder variants designed primarily for ships and power generation with power output up to 4300 kW or engines such as the Renault dXi 7 having 6 cylinders and a power output around 240 kW. A typical passenger car diesel engine is the Peugeot DW10 having 4 cylinders and power output of 100 kW or less depending on the variant.

In all of the diesel engines relating to this invention, a common feature is a high pressure fuel system. Typically pressures in excess of 1350 bar ($1.35 \times 10^8$ Pa) are used but often pressures of up to 2000 bar ($2 \times 10^8$ Pa) or more may exist.

Two non-limiting examples of such high pressure fuel systems are: the common rail injection system, in which the fuel is compressed utilizing a high-pressure pump that supplies it to the fuel injection valves through a common rail; and the unit injection system which integrates the high-pressure pump and fuel injection valve in one assembly, achieving the highest possible injection pressures exceeding 2000 bar ($2 \times 10^8$ Pa). In both systems, in pressurizing the fuel, the fuel gets hot, often to temperatures around 100° C., or above.

In common rail systems, the fuel is stored at high pressure in the central accumulator rail or separate accumulators prior to being delivered to the injectors. Often, some of the heated fuel is returned to the low pressure side of the fuel system or returned to the fuel tank. In unit injection systems the fuel is compressed within the injector in order to generate the high injection pressures. This in turn increases the temperature of the fuel.

In both systems, fuel is present in the injector body prior to injection where it is heated further due to heat from the combustion chamber. The temperature of the fuel at the tip of the injector can be as high as 250-350° C.

Thus the fuel is stressed at pressures from 1350 bar ($1.35 \times 10^8$ Pa) to over 2000 bar ($2 \times 10^8$ Pa) and temperatures from around 100° C. to 350° C. prior to injection, sometimes being recirculated back within the fuel system thus increasing the time for which the fuel experiences these conditions.

A common problem with diesel engines is fouling of the injector, particularly the injector body, and the injector nozzle. Fouling may also occur in the fuel filter. Injector nozzle fouling occurs when the nozzle becomes blocked with deposits from the diesel fuel. Fouling of fuel filters may be related to the recirculation of fuel back to the fuel tank. Deposits increase with degradation of the fuel. Deposits may take the form of carbonaceous coke-like residues, lacquers or sticky or gum-like residues. Diesel fuels become more and more unstable the more they are heated, particularly if heated under pressure. Thus diesel engines having high pressure fuel systems may cause increased fuel degradation. In recent years the need to reduce emissions has led to the continual redesign of injection systems to help meet lower targets. This has led to increasingly complex injectors and lower tolerance to deposits.

The problem of injector fouling may occur when using any type of diesel fuels. However, some fuels may be particularly prone to cause fouling or fouling may occur more quickly when these fuels are used. For example, fuels containing biodiesel and those containing metallic species may lead to increased deposits.

When injectors become blocked or partially blocked, the delivery of fuel is less efficient and there is poor mixing of the fuel with the air. Over time this leads to a loss in power of the engine and increased exhaust emissions and poor fuel economy.

Deposits are known to occur in the spray channels of the injector, leading to reduced flow and power loss. As the size of the injector nozzle hole is reduced, the relative impact of deposit build up becomes more significant. Deposits are also known to occur at the injector tip. Here they affect the fuel spray pattern and cause less effective combustion and associated higher emissions and increased fuel consumption.

In addition to these "external" injector deposits in the nozzle hole and at the injector tip which lead to reduced flow and power loss, deposits may occur within the injector body causing further problems. These deposits may be referred to as internal diesel injector deposits (or IDIDs). IDIDs may occur further up inside the injector on the critical moving parts. They can hinder the movement of these parts affecting the timing and quantity of fuel injection. Since modern diesel engines operate under very precise conditions these deposits can have a significant impact on performance.

IDIDs cause a number of problems, including power loss and reduced fuel economy due to less than optimal fuel metering and combustion. Initially the user may experience cold start problems and/or rough engine running. These deposits can lead to more serious injector sticking. This occurs when the deposits stop parts of the injector from moving and thus the injector stops working. When several or all of the injectors stick the engine may fail completely.

IDIDs are recognised as a serious problem by those working in the field and a new engine test has been developed by the industry based organisation, the Coordinating European Council (CEC). The IDID DW10C test was developed to be able to discriminate between a fuel that produces no measurable deposits and one which produces deposits that cause startability issues considered unacceptable. The objective of the test is to discriminate between fuels that differ in their ability to produce IDIDs in direct injection common rail diesel engines. The test is still under development. However the merit system used to evaluate fuels in this specification is described in example 12.

The present inventors have studied these internal diesel injector deposits and have found that they contain a number of components. However they believe that the presence of lacquers and/or carboxylate residues lead to injector sticking.

Lacquers are varnish-like deposits which are insoluble in fuel and common organic solvents. Some occurrences of lacquers have been found by analysis to contain amide functionality and it has been suggested that they form due to the presence of low molecular weight amide containing species in the fuel.

Carboxylate residues may be present from a number of sources. By carboxylate residues we mean to refer to salts of carboxylic acids. These may be short chain carboxylic acids but more commonly long chain fatty acid residues are present. The carboxylic residues may be present as ammonium and/or metal salts. Both carboxylic acids and metals may be present in diesel fuel from a number of sources. Carboxylic acids are commonly added into fuel as lubricity additives and/or corrosion inhibitors; they may occur due to oxidation of the fuel and may form during the combustion process; residual fatty acids may be present in the fatty acid methyl esters included as biodiesel; and they may also be present as byproducts in other additives. Derivatives of fatty acids may also be present and these may react or decompose to form carboxylic acids.

Various metals may be present in fuel compositions. This may be due to contamination of the fuel during manufacture, storage, transport or use or due to contamination of fuel additives. Metal species may also be added to fuels deliberately. For example transition metals are sometimes added as fuel borne catalysts to improve the performance of diesel particulate filters.

The present inventors believe that one of the causes of injector sticking occurs when metal or ammonium species react with carboxylic acid species in the fuel. One example of injector sticking has arisen due to sodium contamination of the fuel. Sodium contamination may occur for a number of reasons. For example sodium hydroxide may be used in a washing step in the hydrodesulfurisation process and could lead to contamination. Sodium may also be present due to the use of sodium-containing corrosion inhibitors in pipelines. Another example can arise from the presence of calcium from for example interaction with or contamination with a lubricant or from calcium chloride used in salt drying processes in refineries. Other metal contamination may occur for example during transportation due to water bottoms.

Metal contamination of diesel fuel and the resultant formation of carboxylate salts is believed to be a major cause of injector sticking. The formation of lacquers is yet another major cause of injector sticking.

Various additives and combinations of additives have been proposed to control IDIDs. For example WO2015/011505 describes the use of a combination of a quaternary ammonium salt additive and a succinimide detergent to combat IDIDs. However the present inventors have since been found that for severely fouled engines in which the level of internal diesel injector deposits is very high the combinations of additives described in WO2015/011505 are not always effective.

SUMMARY

There is therefore a need to provide additive formulations which tackle the particular problem of severe engine fouling.

DETAILED DESCRIPTION

According to a first aspect of the present invention there is provided a method of cleaning up internal diesel injector deposits in a severely fouled engine, the method comprising combusting in the engine a diesel fuel composition comprising (a) a quaternary ammonium salt additive; and (b) one or more further nitrogen-containing detergents; wherein the quaternary ammonium salt additive comprises the quaternised reaction product of a hydrocarbyl substituted succinic acid derived acylating agent and a compound able to react with said acylating agent and which includes a tertiary amine group; wherein each molecule of the hydrocarbyl substituted succinic acid derived acylating agent includes on average at least 1.2 succinic acid moieties.

According to a second aspect of the present invention there is provided the use of a combination of (a) a quaternary ammonium salt additive and (b) one or more further nitrogen-containing detergents to clean up internal diesel injector deposits in a severely fouled engine; wherein the quaternary ammonium salt additive comprises the quaternised reaction product of a hydrocarbyl substituted succinic acid derived acylating agent and a compound able to react with said acylating agent and which includes a tertiary amine group; wherein each molecule of the hydrocarbyl substituted succinic acid derived acylating agent includes on average at least 1.2 succinic acid moieties.

According to a third aspect of the invention there is provided a diesel fuel composition comprising (a) a quaternary ammonium salt additive; and (b) one or more further nitrogen-containing detergents; wherein the quaternary ammonium salt additive comprises the quaternised reaction product of a hydrocarbyl substituted succinic acid derived acylating agent and a compound able to react with said acylating agent and which includes a tertiary amine group; wherein each molecule of the hydrocarbyl substituted succinic acid derived acylating agent includes on average at least 1.2 succinic acid moieties.

DETAILED DESCRIPTION

Figure 1:
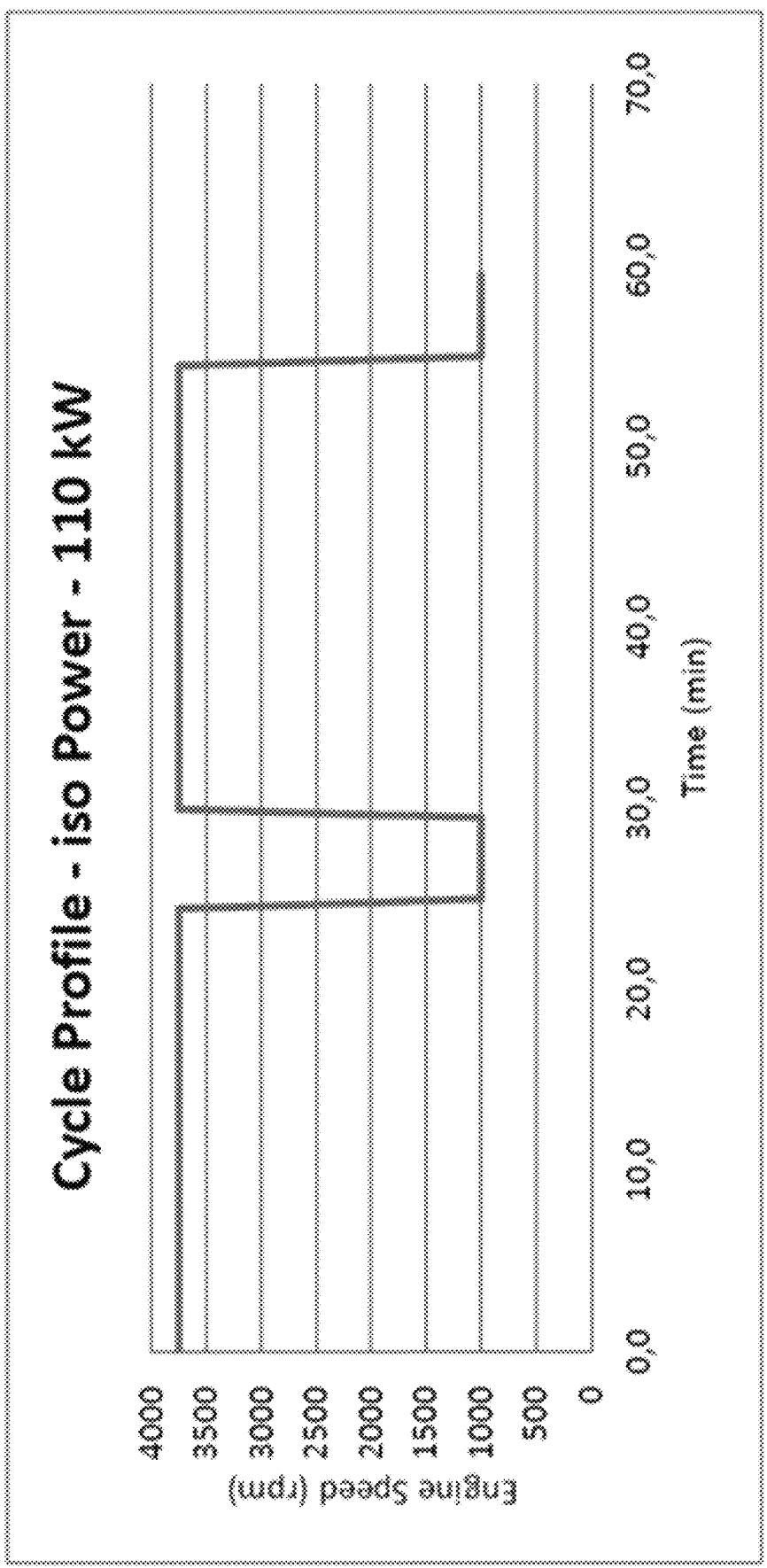
FIG. 1 illustrates the cycle profile according to Example 12.

Preferred features of the first, second and third aspects of the present invention will now be described.

The present invention involves the use of a combination of additives. Additive (a) is a quaternary ammonium salt which is the quaternised reaction product of a hydrocarbyl substituted succinic acid derived acylating agent and a compound able to react with said acylating agent and which includes a tertiary amine group.

For the avoidance of doubt reference to the quaternised reaction product is meant to refer to a reaction product which comprises the tertiary amine which has then been quaternised to form a quaternary ammonium group. The quaternary ammonium salt additive is formed by reacting a quaternising agent with the reaction product of a hydrocarbyl substituted succinic acid derived acylating agent and a compound able to react with said acylating agent and which includes a tertiary amine group.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:
 (i) hydrocarbon groups, that is, aliphatic (which may be saturated or unsaturated, linear or branched, e.g., alkyl or alkenyl), alicyclic (e.g., cycloalkyl, cycloalkenyl) substituents, and aromatic (including aliphatic- and alicyclic-substituted aromatic) substituents, as well as cyclic substituents wherein the ring is completed through another portion of the molecule (e.g., two substituents together form a ring);
 (ii) substituted hydrocarbon groups, that is, substituents containing non-hydrocarbon groups which, in the context of this invention, do not alter the predominantly hydrocarbon nature of the substituent (e.g., halo (e.g. chloro, fluoro or bromo), hydroxy, alkoxy (e.g. $C_1$ to $C_4$ alkoxy), keto, acyl, cyano, mercapto, amino, amido, nitro, nitroso, sulfoxy, nitryl and carboxy);
 (iii) hetero substituents, that is, substituents which, while having a predominantly hydrocarbon character, in the context of this invention, contain other than carbon in a ring or chain otherwise composed of carbon atoms. Heteroatoms include sulphur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

Suitable hydrocarbyl substituted succinic acid derived acylating agents and means of preparing them are well known in the art. For example a common method of preparing a hydrocarbyl substituted succinic acylating agent is by the reaction of maleic anhydride with an olefin using a chlorination route or a thermal route (the so-called "ene" reaction).

Illustrative of hydrocarbyl substituent based groups include n-octyl, n-decyl, n-dodecyl, tetrapropenyl, n-octadecyl, oleyl, chloroctadecyl, triicontanyl, etc. The hydrocarbyl based substituents may be made from homo- or interpolymers (e.g. copolymers, terpolymers) of mono- and di-olefins having 2 to 10 carbon atoms, for example ethylene, propylene, butane-1, isobutene, butadiene, isoprene, 1-hexene, 1-octene, etc. Preferably these olefins are 1-monoolefins. Alternatively the substituent may be made from other sources, for example monomeric high molecular weight alkenes (e.g. 1-tetra-contene), aliphatic petroleum fractions, for example paraffin waxes and cracked analogs thereof, white oils, synthetic alkenes for example produced by the Ziegler-Natta process (e.g. poly(ethylene) greases) and other sources known to those skilled in the art. Any unsaturation in the substituent may if desired be reduced or eliminated by hydrogenation according to procedures known in the art.

Preferably the hydrocarbyl substituents are predominantly saturated, that is, they contain no more than one carbon-to-carbon unsaturated bond for every ten carbon-to-carbon single bonds present. Most preferably they contain no more than one carbon-to-carbon non-aromatic unsaturated bond for every 50 carbon-to-carbon bonds present.

The hydrocarbyl substituent of the succinic acid derived acylating agent preferably comprises at least 10, more preferably at least 12, for example at least 30 or at least 40 carbon atoms. It may comprise up to about 200 carbon atoms. Preferably the hydrocarbyl substituent of the acylating agent has a number average molecular weight (Mn) of between 170 to 2800, for example from 250 to 1500, preferably from 500 to 1500 and more preferably 500 to 1100. An Mn of 700 to 1300 is especially preferred.

The hydrocarbyl substituted succinic acid derived acylating agent may comprise a mixture of compounds. For example a mixture of compounds having different hydrocarbyl substituents may be used.

Preferred hydrocarbyl-based substituents are polyisobutenes. Such compounds are known to the person skilled in the art.

Preferred hydrocarbyl substituted succinic acid derived acylating agents are polyisobutenyl succinic anhydrides. These compounds are commonly referred to as "PIBSAs" and are known to the person skilled in the art.

Conventional polyisobutenes and so-called "highly-reactive" polyisobutenes are suitable for use in the invention. Highly reactive polyisobutenes in this context are defined as polyisobutenes wherein at least 50%, preferably 70% or more, of the terminal olefinic double bonds are of the vinylidene type as described in EP0565285. Particularly preferred polyisobutenes are those having more than 80 mol % and up to 100 mol % of terminal vinylidene groups such as those described in U.S. Pat. No. 7,291,758. Preferred polyisobutenes have preferred molecular weight ranges as described above for hydrocarbyl substituents generally.

Other preferred hydrocarbyl groups include those having an internal olefin for example as described in the applicant's published application WO2007/015080.

An internal olefin as used herein means any olefin containing predominantly a non-alpha double bond, that is a beta or higher olefin. Preferably such materials are substantially completely beta or higher olefins, for example containing less than 10% by weight alpha olefin, more preferably less than 5% by weight or less than 2% by weight. Typical internal olefins include Neodene 1518IO available from Shell.

Internal olefins are sometimes known as isomerised olefins and can be prepared from alpha olefins by a process of isomerisation known in the art, or are available from other sources. The fact that they are also known as internal olefins reflects that they do not necessarily have to be prepared by isomerisation.

Preferred hydrocarbyl substituted succinic acid derived acylating agents for use in preparing additive (a) of the present invention are polyisobutenyl substituted succinic anhydrides or PIBSAs. Especially preferred PIBSAs are those having a PIB molecular weight (Mn) of from 300 to 2800, preferably from 450 to 2300, more preferably from 500 to 1300.

The hydrocarbyl substituted succinic acid derived acylating agent is suitably prepared by reacting maleic anhydride with an alkene, for example a polyisobutene. The product obtained (such as a PIBSA) still includes a double bond. The maleic anhydride is present in the resultant molecule as a succinic acid moiety.

The monomaleated PIBSA may have the structure (A) or (B):

(A)
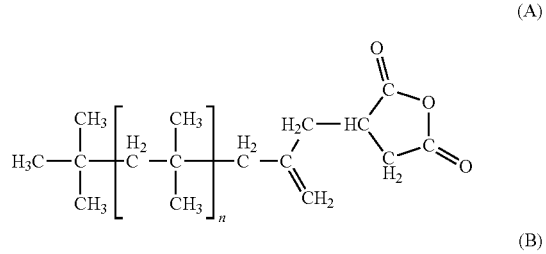

(B)
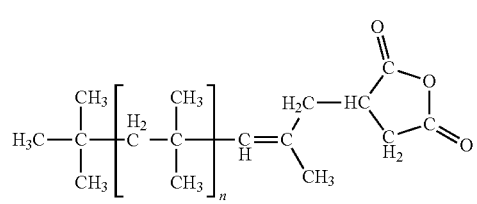

The double bond in the monomaleated product can react with a further molecule of maleic anhydride to form a bismaleated PIBSA having the structure (C) or (D):

(C)
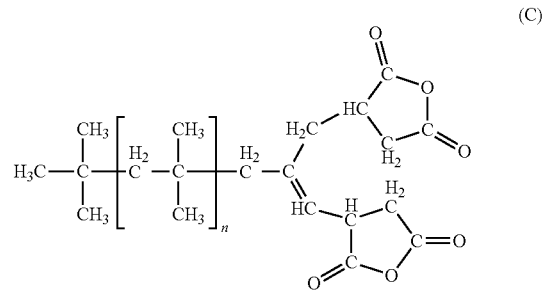

(D)
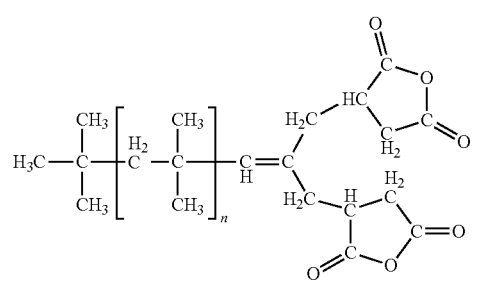

Thus it is possible to provide a hydrocarbyl group which is substituted with more than one succinic acid moiety. In such embodiments each molecule of the hydrocarbyl substituted succinic acid derived acylating agent includes more than one succinic acid moiety.

The skilled person will appreciate that the additives used in the invention typically comprise mixtures of compounds and will be prepared from a mixture of monomaleated and bismaleated PIBSAs. The PIBSAs may be defined in terms of their level of bismaleation.

One way in which this may be determined is by calculating the average number of succinic acid moieties per molecule of acylating agent.

A monomaleated PIBSA has one succinic acid moiety per module.

A bismaleated PIBSA has two succinic acid moieties per molecule.

A mixture comprising monomaleated PIBSA and bismaleated PIBSA in a 1:1 molar ratio would comprise an average of 1.5 succinic acid moieties per molecule of PIBSA.

The average number of succinic acid moieties per molecule of acylating agent is sometimes referred to in the art as "P value".

One way in which the P value can be determined empirically is described in relation to the examples.

The present invention relates in particular to the use of quaternary ammonium salts derived from hydrocarbyl substituted acylating agents which include an average of at least 1.2 succinic acid moieties per molecule.

As the skilled person will appreciate, a single molecule cannot have 1.2 succinic acid moieties. What is meant by at least 1.2 succinic acid moieties is the mean number of succinic acid moieties per molecule of acylating agent as the sum of all the succinic acid moieties present in a sample divided by the total number of molecules of acylating agent having one or more succinic acid moieties present in the sample.

The present inventors have surprisingly found that when the quaternary ammonium salt additive is prepared from a hydrocarbyl substituted succinic acid derived acylating agent comprising on average at least 1.2 succinic acid moieties per molecule improved clean up of IDIDs is seen in a severely fouled engine when used in combination with a further nitrogen-containing detergent.

Preferably the hydrocarbyl substituted succinic acid derived acylating agent comprises on average at least 1.21 succinic acid moieties per molecule, more preferably at least 1.22 succinic acid moieties per molecule.

In some embodiments the hydrocarbyl substituted succinic acid derived acylating agent may comprise at least 1.23 or at least 1.24 succinic acid moieties per molecule.

In some embodiments the hydrocarbyl substituted succinic acid derived acylating agent may comprise at least 1.25, at least 1.26 or at least 1.27 succinic acid moieties per molecule.

In some embodiments the hydrocarbyl substituted succinic acid derived acylating agent may comprise at least 1.28, at least 1.29 or at least 1.30 succinic acid moieties per molecule.

By succinic acid moiety we mean to include residues of succinic acid present in diacid or anhydride form.

The hydrocarbyl substituted succinic acid derived acylating agent is reacted with a compound able to react with said acylating agent and which includes a tertiary amine group. The tertiary amine group is quaternised to provide the quaternary ammonium salt additive.

Examples of suitable compounds able to react with the hydrocarbyl substituted succinic acid derived acylating agent and which include a tertiary amine group can include but are not limited to: N,N-dimethylaminopropylamine, N,N-diethylaminopropylamine, N,N-dimethylamino ethylamine. The nitrogen or oxygen containing compounds capable of condensing with the acylating agent and further having a tertiary amino group can further include amino alkyl substituted heterocyclic compounds such as 1-(3-aminopropyl)imidazole and 4-(3-aminopropyl)morpholine, 1-(2-aminoethyl)piperidine, 3,3-diamino-N-methyldipropylamine, and 3'3-aminobis(N,N-dimethylpropylamine). Other types of nitrogen or oxygen containing compounds capable of condensing with the acylating agent and having a tertiary amino group include alkanolamines including but not limited to triethanolamine, trimethanolamine, N,N-dimethylaminopropanol, N,N-dimethylaminoethanol, N,N-diethylaminopropanol, N,N-diethylaminoethanol, N,N-diethylaminobutanol, N,N,N-tris(hydroxyethyl)amine, N,N,N-tris(hydroxymethyl)amine, N,N,N-tris(aminoethyl)amine, N,N-dibutylaminopropylamine and N,N,N'-trimethyl-N'-hydroxyethyl-bisaminoethylether; N,N-bis(3-dimethylaminopropyl)-N-isopropanolamine; N-(3-dimethylaminopropyl)-N,N-diisopropanolamine; N'-(3-(dimethylamino)propyl)-N,N-dimethyl 1,3-propanediamine; 2-(2-dimethylaminoethoxy)ethanol, N,N,N'-trimethylaminoethylethanolamine and 3-(2-(dimethylamino)ethoxy)propylamine.

Preferably the compound able to react with hydrocarbyl substituted succinic acid derived acylating agent and which includes a tertiary amine group is an amine of formula (I) or (II):

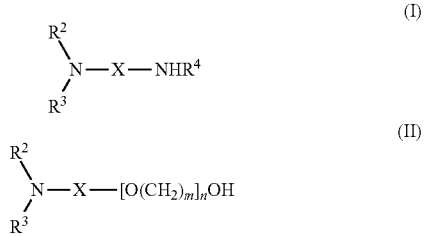

wherein $R^2$ and $R^3$ are the same or different alkyl, alkenyl, aryl, alkaryl or aralkyl groups having from 1 to 22 carbon atoms; X is a bond or an optionally substituted alkylene group having from 1 to 20 carbon atoms; n is from 0 to 20; m is from 1 to 5; and $R^4$ is hydrogen or a $C_1$ to $C_{22}$ alkyl group.

When a compound of formula (I) is used, $R^4$ is preferably hydrogen or a $C_1$ to $C_{16}$ alkyl group, preferably a $C_1$ to $C_{10}$ alkyl group, more preferably a $C_1$ to $C_6$ alkyl group. When $R^4$ is alkyl it may be straight chained or branched. It may be substituted for example with a hydroxy or alkoxy substituent. Preferably $R^4$ is not a substituted alkyl group. More preferably $R^4$ is selected from hydrogen, methyl, ethyl, propyl, butyl and isomers thereof. Most preferably $R^4$ is hydrogen.

When a compound of formula (II) is used, m is preferably 2 or 3, most preferably 2; n is preferably from 0 to 15, preferably 0 to 10, more preferably from 0 to 5. Most preferably n is 0 and the compound of formula (II) is an alcohol.

Preferably the hydrocarbyl substituted acylating agent is reacted with a diamine compound of formula (I).

$R^2$ and $R^3$ are the same or different alkyl, alkenyl, aryl, alkaryl or aralkyl groups having from 1 to 22 carbon atoms. In some embodiments $R^2$ and $R^3$ may be joined together to form a ring structure, for example a piperidine, imidazole or morpholine moiety. Thus $R^2$ and $R^3$ may together form an aromatic and/or heterocyclic moiety. $R^2$ and $R^3$ may be branched alkyl or alkenyl groups. Each may be substituted, for example with a hydroxy or alkoxy substituent.

Preferably each of $R^2$ and $R^3$ is independently a $C_1$ to $C_{16}$ alkyl group, preferably a $C_1$ to $C_{10}$ alkyl group. $R^2$ and $R^3$ may independently be methyl, ethyl, propyl, butyl, pentyl, hexyl, heptyl, octyl, or an isomer of any of these. Preferably $R^2$ and $R^3$ is each independently $C_1$ to $C_4$ alkyl. Preferably $R^2$ is methyl. Preferably $R^3$ is methyl.

X is a bond or an optionally substituted alkylene group having from 1 to 20 carbon atoms. In preferred embodiments when X is an alkylene group this group may be straight chained or branched. The alkylene group may include a cyclic structure therein. It may be optionally substituted, for example with a hydroxy or alkoxy substituent. In some embodiments X may include a heteroatom within the alkylene chain, for example X may include an ether functionality.

X is preferably an alkylene group having 1 to 16 carbon atoms, preferably 1 to 12 carbon atoms, more preferably 1 to 8 carbon atoms, for example 2 to 6 carbon atoms or 2 to 5 carbon atoms.

In some preferred embodiments X is an unsubstituted alkylene group. Most preferably X is an ethylene, propylene or butylene group, especially a propylene group.

Examples of compounds of formula (I) suitable for use herein include 1-aminopiperidine, 1-(2-aminoethyl)piperidine, 1-(3-aminopropyl)-2-pipecoline, 1-methyl-(4-methylamino) piperidine, 4-(1-pyrrolidinyl)piperidine, 1-(2-aminoethyl)pyrrolidine, 2-(2-aminoethyl)-1-methylpyrrolidine, N,N-diethylethylenediamine, N,N-dimethylethylenediamine, N,N-dibutylethylenediamine, N,N-diethyl-1,3-diaminopropane, N,N-dimethyl-1,3-diaminopropane, N,N,N'-trimethylethylenediamine, N,N-dimethyl-N'-ethylethylenediamine, N,N-diethyl-N'-methylethylenediamine, N,N,N'-triethylethylenediamine, 3-dimethylaminopropylamine, 3-diethylaminopropylamine, 3-dibutylaminopropylamine, N,N,N'-trimethyl-1,3-propanediamine, N,N,2,2-tetramethyl-1,3-propanediamine, 2-amino-5-diethylaminopentane, N,N,N',N'-tetraethyldiethylenetriamine, 3,3'-diamino-N-methyldipropylamine, 3,3'-iminobis(N,N-dimethylpropylamine), 1-(3-aminopropyl)imidazole and 4-(3-aminopropyl)morpholine, 1-(2-aminoethyl)piperidine, 3,3-diamino-N-methyldipropylamine, 3,3-aminobis(N,N-dimethylpropylamine), 3-(2-(dimethylamino)ethoxy)propylamine, or combinations thereof.

In some preferred embodiments the compound of formula (I) is selected from N,N-dimethyl-1,3-diaminopropane, N,N-diethyl-1,3-diaminopropane, N,N-dimethylethylenediamine, N,N-diethylethylenediamine, N,N-dibutylethylenediamine, 3-(2-(dimethylamino)ethoxy)propylamine, or combinations thereof.

Examples of compounds of formula (II) suitable for use herein include alkanolamines including but not limited to triethanolamine, N,N-dimethylaminopropanol, N,N-diethylaminopropanol, N,N-diethylaminobutanol, triisopropanolamine, 1-[2-hydroxyethyl]piperidine, 2-[2-(dimethylamine)ethoxy]-ethanol, N-ethyldiethanolamine, N-methyldiethanolamine, N-butyldiethanolamine, N,N-diethylaminoethanol, N,N-dimethyl amino-ethanol, 2-dimethylamino-2-methyl-1-propanol, N,N,N'-trimethyl-N'-hydroxyethyl-bisaminoethylether; N,N-bis(3-dimethylaminopropyl)-N-isopropanolamine; N-(3-dimethylaminopropyl)-N,N-diisopropanolamine; N'-(3-(dimethylamino)propyl)-N,N-dimethyl 1,3-propanediamine; 2-(2-dimethylaminoethoxy) ethanol, and N,N,N'-trimethylaminoethylethanolamine.

In some preferred embodiments the compound of formula (B2) is selected from Triisopropanolamine, 1-[2-hydroxyethyl]piperidine, 2-[2-(dimethylamine)ethoxy]-ethanol, N-ethyldiethanolamine, N-methyldiethanolamine, N-butyldiethanolamine, N,N-diethylaminoethanol, N,N-dimethylaminoethanol, 2-dimethylamino-2-methyl-1-propanol, or combinations thereof.

An especially preferred compound of formula (I) is N,N-dimethyl-1,3-diaminopropane (dimethylaminopropylamine).

When a compound of formula (II) is reacted with a succinic acylating agent the resulting product is a succinic ester. When a succinic acylating agent is reacted with a compound of formula (I) in which R4 is hydrogen the resulting product may be a succinimide or a succinamide. When a succinic acylating agent is reacted with a compound of formula (I) in which R4 is not hydrogen the resulting product is an amide.

To form the quaternary ammonium salt additive (a) the hydrocarbyl substituted succinic acid derived acylating agent is reacted with a compound able to react with said acylating agent and which includes a tertiary amine group. This reaction product is then quaternised by reaction with a quaternising agent.

The reaction product of the acylating agent and compound which includes a tertiary amine group is preferably reacted with at least one molar equivalent of quaternising agent per mole of tertiary amine group present in the reaction product.

Preferably the reaction product of the acylating agent and compound which includes a tertiary amine group is reacted with more than one molar equivalent of quaternising agent per mole of tertiary amine group present in the reaction product, preferably at least 1.2 molar equivalents of quaternising agent per mole of tertiary amine group, more preferably at least 1.5 molar equivalents of quaternising agent, suitably at least 1.7 molar equivalents of quaternising agent, for example at least 1.9 molar equivalents of quaternising agent.

Preferably the reaction product of the acylating agent and compound which includes a tertiary amine group is reacted with two or more molar equivalents of quaternising agent per mole of tertiary amine group present in the reaction product, preferably at least 2.1 molar equivalents of quaternising agent.

In some embodiments the reaction product of the acylating agent and compound which includes a tertiary amine group is reacted with more than 2.2 molar equivalents of quaternising agent per mole of tertiary amine group present in the reaction product, for example from 2.3 to 4 molar equivalents, from 2.3 to 3 molar equivalents, or from 2.3 to 2.7 or from 2.5 to 3 molar equivalents.

Any suitable quaternising agent may be used. The quaternising agent may suitably be selected from esters and non-esters.

Suitable quaternising agents include esters of a carboxylic acid, dialkyl sulfates, benzyl halides, hydrocarbyl substituted carbonates, hydrocarbyl substituted epoxides optionally in combination with an acid, alkyl halides, alkyl sulfonates, sultones, hydrocarbyl substituted phosphates, hydrocarbyl substituted borates, alkyl nitrites, alkyl nitrates, hydroxides, N-oxides, chloroacetic acid or salts thereof, or mixtures thereof.

In some preferred embodiments, quaternising agents used to form the quaternary ammonium salt additives of the present invention are esters.

Preferred ester quaternising agents are compounds of formula (III):

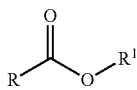

(III)

in which R is an optionally substituted alkyl, alkenyl, aryl or alkylaryl group and $R^1$ is a C1 to C22 alkyl, aryl or alkylaryl group. The compound of formula (III) is suitably an ester of a carboxylic acid capable of reacting with a tertiary amine to form a quaternary ammonium salt.

Suitable quaternising agents include esters of carboxylic acids having a pKa of 3.5 or less.

The compound of formula (III) is preferably an ester of a carboxylic acid selected from a substituted aromatic carboxylic acid, an α-hydroxycarboxylic acid and a polycarboxylic acid.

In some preferred embodiments the compound of formula (III) is an ester of a substituted aromatic carboxylic acid and thus R is a substituted aryl group.

Preferably R is a substituted aryl group having 6 to 10 carbon atoms, preferably a phenyl or naphthyl group, most preferably a phenyl group. R is suitably substituted with one or more groups selected from carboalkoxy, nitro, cyano, hydroxy, SR5 or NR5R6. Each of R5 and R6 may be hydrogen or optionally substituted alkyl, alkenyl, aryl or carboalkoxy groups. Preferably each of R5 and R6 is hydrogen or an optionally substituted C1 to C22 alkyl group, preferably hydrogen or a C1 to C16 alkyl group, preferably hydrogen or a C1 to C10 alkyl group, more preferably hydrogen or a C1 to C4 alkyl group. Preferably R5 is hydrogen and R6 is hydrogen or a C1 to C4 alkyl group. Most preferably R5 and R6 are both hydrogen. Preferably R is an aryl group substituted with one or more groups selected from hydroxyl, carboalkoxy, nitro, cyano and $NH_2$. R may be a poly-substituted aryl group, for example trihydroxyphenyl. In some embodiments R may be a hydrocarbyl substituted aryl group, for example an alkyl substituted aryl group. In some embodiments R may be an aryl group substituted with a hydroxy group and a hydrocarbyl group, such as an alkyl group, for example as described in EP2631283.

Preferably R is a mono-substituted aryl group. Preferably R is an ortho substituted aryl group. Suitably R is substituted with a group selected from OH, NH2, NO2 or COOMe. Preferably R is substituted with an OH or $NH_2$ group. Suitably R is a hydroxy substituted aryl group. Most preferably R is a 2-hydroxyphenyl group.

Preferably $R^1$ is an alkyl, aralkyl or alkaryl group. $R^1$ may be a $C_1$ to $C_{16}$ alkyl group, preferably a C1 to C10 alkyl group, suitably a C1 to C8 alkyl group. $R^1$ may be C7 to C16 aralkyl or alkaryl group, preferably a C7 to C10 aralkyl or alkaryl group. $R^1$ may be methyl, ethyl, propyl, butyl, pentyl, benzyl or an isomer thereof. Preferably $R^1$ is benzyl or methyl. Most preferably $R^1$ is methyl.

Especially preferred compounds of formula (III) are lower alkyl esters of salicylic acid such as methyl salicylate, ethyl salicylate, n and i propyl salicylate, and butyl salicylate, preferably methyl salicylate.

In some embodiments the compound of formula (III) is an ester of an α-hydroxycarboxylic acid. In such embodiments the compound has the structure:

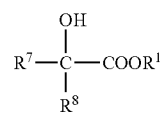

wherein R7 and R8 are the same or different and each is selected from hydrogen, alkyl, alkenyl, aralkyl or aryl. Compounds of this type suitable for use herein are described in EP 1254889.

Examples of compounds of formula (III) in which RCOO is the residue of an α-hydroxycarboxylic acid include methyl-, ethyl-, propyl-, butyl-, pentyl-, hexyl-, benzyl-, phenyl-, and allyl esters of 2-hydroxyisobutyric acid; methyl-, ethyl-, propyl-, butyl-, pentyl-, hexyl-, benzyl-, phenyl-, and allyl esters of 2-hydroxy-2-methylbutyric acid; methyl-, ethyl-, propyl-, butyl-, pentyl-, hexyl-, benzyl-, phenyl-, and allyl esters of 2-hydroxy-2-ethylbutyric acid; methyl-, ethyl-, propyl-, butyl-, pentyl-, hexyl-, benzyl-, phenyl-, and allyl esters of lactic acid; and methyl-, ethyl-, propyl-, butyl-, pentyl-, hexyl-, allyl-, benzyl-, and phenyl esters of glycolic acid. Of the above, a preferred compound is methyl 2-hydroxyisobutyrate.

In some embodiments the compound of formula (III) is an ester of a polycarboxylic acid. In this definition we mean to include dicarboxylic acids and carboxylic acids having more than 2 acidic moieties. In such embodiments RCOO is preferably present in the form of an ester, that is the one or more further acid groups present in the group R are in esterified form. However embodiments in which not all acid groups are esterified are within the invention. Mixed esters of polycarboxylic acids may also be used. Preferred esters are C1 to C4 alkyl esters.

The ester quaternising agent may be selected from the diester of oxalic acid, the diester of phthalic acid, the diester of maleic acid, the diester of malonic acid or the diester of citric acid. One especially preferred compound of formula (III) is dimethyl oxalate.

In preferred embodiments the compound of formula (III) is an ester of a carboxylic acid having a pKa of less than 3.5. In such embodiments in which the compound includes more than one acid group, we mean to refer to the first dissociation constant.

The ester quaternising agent may be selected from an ester of a carboxylic acid selected from one or more of oxalic acid, phthalic acid, salicylic acid, maleic acid, malonic acid, citric acid, nitrobenzoic acid, aminobenzoic acid and 2, 4, 6-trihydroxybenzoic acid.

Preferred ester quaternising agents include dimethyl oxalate, methyl 2-nitrobenzoate and methyl salicylate.

In some preferred embodiments, quaternising agents used to form the quaternary ammonium salt additives of the present invention are esters selected from dimethyl oxalate, methyl 2-nitrobenzoate and methyl salicylate, preferably dimethyl oxalate and methyl salicylate.

Suitable non-ester quaternising agents include dialkyl sulfates, benzyl halides, hydrocarbyl substituted carbonates, hydrocarbyl substituted epoxides optionally in combination with an acid, alkyl halides, alkyl sulfonates, sultones, hydrocarbyl substituted phosphates, hydrocarbyl substituted borates, alkyl nitrites, alkyl nitrates, hydroxides, N-oxides, chloroacetic acid or salts thereof, or mixtures thereof.

In some embodiments the quaternary ammonium salt may be prepared from, for example, an alkyl or benzyl halide (especially a chloride) and then subjected to an ion exchange reaction to provide a different anion as part of the quaternary ammonium salt. Such a method may be suitable to prepare quaternary ammonium hydroxides, alkoxides, nitrites or nitrates.

Preferred non-ester quaternising agents include dialkyl sulfates, benzyl halides, hydrocarbyl substituted carbonates, hydrocarbyl substituted epoxides in combination with an acid, alkyl halides, alkyl sulfonates, sultones, hydrocarbyl substituted phosphates, hydrocarbyl substituted borates, N-oxides, chloroacetic acid or salts thereof, or mixtures thereof.

Suitable dialkyl sulfates for use herein as quaternising agents include those including alkyl groups having 1 to 10, preferably 1 to 4 carbons atoms in the alkyl chain. A preferred compound is dimethyl sulfate.

Suitable benzyl halides include chlorides, bromides and iodides. The phenyl group may be optionally substituted, for example with one or more alkyl or alkenyl groups, especially when the chlorides are used. A preferred compound is benzyl bromide.

Suitable hydrocarbyl substituted carbonates may include two hydrocarbyl groups, which may be the same or different. Each hydrocarbyl group may contain from 1 to 50 carbon atoms, preferably from 1 to 20 carbon atoms, more preferably from 1 to 10 carbon atoms, suitably from 1 to 5 carbon atoms. Preferably the or each hydrocarbyl group is an alkyl group. Preferred compounds of this type include diethyl carbonate and dimethyl carbonate.

Suitable hydrocarbyl substituted epoxides have the formula:

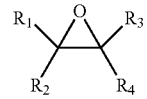

wherein each of R1, R2, R3 and R4 is independently hydrogen or a hydrocarbyl group having 1 to 50 carbon atoms. Examples of suitable epoxides include ethylene oxide, propylene oxide, butylene oxide, styrene oxide and stilbene oxide. The hydrocarbyl epoxides are used as quaternising agents in combination with an acid.

The hydrocarbyl substituted succinic acylating agent includes two acyl groups. In some embodiments only one of these groups reacts with the compound of formula (I) or formula (II) to form a compound having an ester or an amide functional group and a free carboxylic acid. In these embodiments if an epoxide is used as the quaternising agent, a separate acid does not need to be added. However in other embodiments an acid for example acetic acid may be used.

Especially preferred epoxide quaternising agents are propylene oxide and styrene oxide, optionally in combination with an additional acid.

Suitable alkyl halides for use herein include chlorides, bromides and iodides.

Suitable alkyl sulfonates include those having 1 to 20, preferably 1 to 10, more preferably 1 to 4 carbon atoms.

Suitable sultones include propane sultone and butane sultone.

Suitable hydrocarbyl substituted phosphates include monoalkyl phosphates, dialkyl phosphates, trialkyl phosphates and O,O-dialkyl dithiophospates. Preferred alkyl groups have 1 to 12 carbon atoms.

Suitable hydrocarbyl substituted borate groups include alkyl borates having 1 to 12 carbon atoms.

Preferred alkyl nitrites and alkyl nitrates have 1 to 12 carbon atoms.

Preferably the non-ester quaternising agent is selected from dialkyl sulfates, benzyl halides, hydrocarbyl substituted carbonates, hydrocarbyl substituted epoxides optionally in combination with an additional acid, chloroacetic acid or a salt thereof, and mixtures thereof.

Especially preferred non-ester quaternising agents for use herein are hydrocarbyl substituted epoxides in combination with an acid. These may include embodiments in which a separate acid is provided or embodiments in which the acid is provided by the tertiary amine compound that is being quaternised. Preferably the acid is provided by the tertiary amine molecule that is being quaternised.

Preferred quaternising agents for use herein include dimethyl oxalate, methyl 2-nitrobenzoate, methyl salicylate, chloroacetic acid or a salt thereof, and styrene oxide or propylene oxide optionally in combination with an additional acid.

In some embodiments mixtures of two or more quaternising agents may be used.

To form some preferred quaternary ammonium salt additives of the present invention the compound of formula (III) is reacted with a compound formed by the reaction of a hydrocarbyl substituted succinic acid acylating agent and an amine of formula (I) or (II).

The compounds of formula (I) or formula (II) are as described above.

The amine of formula (I) or (II) is reacted with a hydrocarbyl substituted succinic acid derived acylating agent such as a succinic acid or succinic anhydride.

Suitably approximately one equivalent of amine is added per succinic acid moiety present in the acylating agent. The ratio of amine used will thus typically depend on the average number of succinic acid moieties present in each molecule of the acylating agent.

An especially preferred quaternary ammonium salt for use herein is formed by reacting methyl salicylate or dimethyl oxalate with the reaction product of a polyisobutylene-substituted succinic anhydride having a PIB molecular weight of 700 to 1300 and dimethylaminopropylamine; wherein the polyisobutylene-substituted succinic anhydride includes on average at least 1.2 succinic acid moieties per molecule.

US2012/0010112 describes an acid-free process for preparing quaternized nitrogen compounds, wherein a) a compound comprising at least one oxygen- or nitrogen-containing group reactive with the anhydride and additionally comprising at least one quaternizable amino group is added onto a polycarboxylic anhydride compound, and b) the product from stage a) is quaternized using an epoxide quaternizing agent without an additional acid. Such methods could be used to prepare the quaternary ammonium salt additives of the present invention.

The present invention also involves the use of (b) a further nitrogen containing detergent. Any suitable nitrogen containing detergent which is not a quaternary ammonium salt additive as defined in relation to component (a) may be used.

Preferably the further nitrogen containing detergent is selected from one or more of:
(i) the product of a Mannich reaction between an aldehyde, an amine and an optionally substituted phenol;
(ii) the reaction product of a carboxylic acid-derived acylating agent and an amine;
(iii) the reaction product of a carboxylic acid-derived acylating agent and hydrazine;
(iv) a salt formed by the reaction of a carboxylic acid with di-n-butylamine or tri-n-butylamine; and
(v) the reaction product of a hydrocarbyl-substituted dicarboxylic acid or anhydride and an amine compound or salt which product comprises at least one amino triazole group.

Preferably the further nitrogen containing detergent is selected from:
(i) the product of a Mannich reaction between an aldehyde, an amine and an optionally substituted phenol;
(ii) the reaction product of a carboxylic acid-derived acylating agent and an amine; and
(v) the reaction product of a hydrocarbyl-substituted dicarboxylic acid or anhydride and an amine compound or salt which product comprises at least one amino triazole group;
and mixtures thereof.

In some preferred embodiments the further nitrogen containing detergent comprises:
(i) the product of a Mannich reaction between an aldehyde, an amine and an optionally substituted phenol.

In some preferred embodiments the further nitrogen containing detergent comprises:
(ii) the reaction product of a carboxylic acid-derived acylating agent and an amine.

In some preferred embodiments the further nitrogen containing detergent comprises:
(v) the reaction product of a hydrocarbyl-substituted dicarboxylic acid or anhydride and an amine compound or salt which product comprises at least one amino triazole group.

In some preferred embodiments the further nitrogen containing detergent comprises:
(i) the product of a Mannich reaction between an aldehyde, an amine and an optionally substituted phenol; and
(ii) the reaction product of a carboxylic acid-derived acylating agent and an amine.

Component (b) may comprise (i) the product of a Mannich reaction between an aldehyde, an amine and an optionally substituted phenol.

Preferably component (i) comprises the product of a Mannich reaction between:
(x) an aldehyde;
(y) an amine; and
(z) an optionally substituted phenol.

Preferably the aldehyde component used to prepare the Mannich additive is an aliphatic aldehyde. Preferably the aldehyde has 1 to 10 carbon atoms. Most preferably the aldehyde is formaldehyde.

Suitable amines for use in preparing the Mannich additive include monoamines and polyamines. One suitable monoamine is butylamine.

The amine used to prepare the Mannich additive is preferably a polyamine. This may be selected from any compound including two or more amine groups. Preferably the polyamine is a polyalkylene polyamine, preferably a polyethylene polyamine. Most preferably the polyamine comprises tetraethylenepentamine or ethylenediamine.

The optionally substituted phenol component used to prepare the Mannich additive may be substituted with 0 to 4 groups on the aromatic ring (in addition to the phenol OH). For example it may be a hydrocarbyl-substituted cresol. Most preferably the phenol component is a mono-substituted phenol. Preferably it is a hydrocarbyl substituted phenol. Preferred hydrocarbyl substituents are alkyl substituents having 4 to 28 carbon atoms, especially 10 to 14 carbon atoms. Other preferred hydrocarbyl substituents are polyalkenyl substituents. Such polyisobutenyl substituents having a number average molecular weight of from 400 to 2500, for example from 500 to 1500.

Suitable Mannich reaction products and the methods of preparing such additives will be known to the person skilled in the art and include the compounds described, for example, in the applicant's publications WO2009040582 and WO2013017887.

Preferred Mannich reaction product additives are the reaction product of formaldehyde, polyethylene polyamine; and a para-substituted monoalkyl phenol.

An especially preferred Mannich reaction product additive for use herein is the reaction product of dodecyl phenol, formaldehyde and ethylene diamine.

Component (b) may comprise (ii) the reaction product of a carboxylic acid-derived acylating agent and an amine.

These may also be referred to herein in general as acylated nitrogen-containing compounds.

Suitable acylated nitrogen-containing compounds may be made by reacting a carboxylic acid acylating agent with an amine and are known to those skilled in the art.

Preferred hydrocarbyl substituted acylating agents are polyisobutenyl succinic anhydrides. These compounds are commonly referred to as "PIBSAs" and are known to the person skilled in the art.

Conventional polyisobutenes and so-called "highly-reactive" polyisobutenes are suitable for use in the invention.

Especially preferred PIBSAs are those having a PIB molecular weight (Mn) of from 300 to 2800, preferably from 450 to 2300, more preferably from 500 to 1300.

In preferred embodiments the reaction product of the carboxylic acid derived acylating agent and an amine includes at least one primary or secondary amine group.

A preferred acylated nitrogen-containing compound for use herein is prepared by reacting a poly(isobutene)-substituted succinic acid-derived acylating agent (e.g., anhydride, acid, ester, etc.) wherein the poly(isobutene) substituent has a number average molecular weight (Mn) of between 170 to 2800 with a mixture of ethylene polyamines having 2 to about 9 amino nitrogen atoms, preferably about 2 to about 8 nitrogen atoms, per ethylene polyamine and about 1 to about 8 ethylene groups. These acylated nitrogen compounds are suitably formed by the reaction of a molar ratio of acylating agent:amino compound of from 10:1 to 1:10, preferably from 5:1 to 1:5, more preferably from 2:1 to 1:2 and most preferably from 2:1 to 1:1. In especially preferred embodiments, the acylated nitrogen compounds are formed by the reaction of acylating agent to amino compound in a molar ratio of from 1.8:1 to 1:1.2, preferably from 1.6:1 to 1:1.2, more preferably from 1.4:1 to 1:1.1 and most preferably from 1.2:1 to 1:1. Acylated amino compounds of this type and their preparation are well known to those skilled in the art and are described in for example EP0565285 and U.S. Pat. No. 5,925,151.

In some preferred embodiments the composition comprises a detergent of the type formed by the reaction of a polyisobutene-substituted succinic acid-derived acylating agent and a polyethylene polyamine. Suitable compounds are, for example, described in WO2009/040583.

In a preferred embodiment thereaction product of a carboxylic acid-derived acylating agent and an amine (ii) comprises the reaction product of a polyisobutene-substituted succinic acid or succinic anhydride and a polyethylene polyamine selected from ethylenediamine, diethylenetriamine, triethylenetetramine, tetraethylenepentamine, pentaethylenehexamine, hexaethylene-heptamine and mixtures and isomers thereof; wherein polyisobutene substituent has a number average molecular weight of between 500 and 2000, preferably between 600 and 1000.

Component (b) may comprise (v) the reaction product of a hydrocarbyl-substituted dicarboxylic acid or anhydride and an amine compound or salt which product comprises at least one amino triazole group.

Detergent additive (v) is suitably reaction product of a hydrocarbyl substituted dicarboxylic acid or anhydride and an amine compound having the formula:

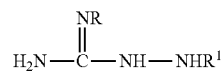

wherein R is selected from the group consisting of a hydrogen and a hydrocarbyl group containing from about 1 to about 15 carbon atoms, and $R^1$ is selected from the group consisting of hydrogen and a hydrocarbyl group containing from about 1 to about 20 carbon atoms.

Detergent additive (v) suitably comprises the reaction product of an amine compound having the formula:

and a hydrocarbyl carbonyl compound of the formula:

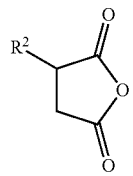

wherein $R^2$ is a hydrocarbyl group having a number average molecular weight ranging from about 100 to about 5000, preferably from 200 to 3000.

Without being bound by theory, it is believed that the reaction product of the amine and hydrocarbyl carbonyl compound is an aminotriazole, such as a bis-aminotriazole compound of the formula:

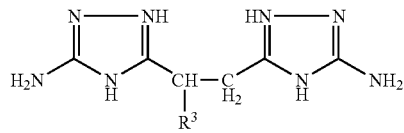

including tautomers having a number average molecular weight ranging from about 200 to about 3000 containing from about 40 to about 80 carbon atoms. The five-membered ring of the triazole is considered to be aromatic.

Non-limiting examples of suitable hydrocarbyl carbonyl compounds include, but are not limited to, hydrocarbyl substituted succinic anhydrides, hydrocarbyl substituted succinic acids, and esters of hydrocarbyl substituted succinic acids. In some preferred embodiments the hydrocarbyl carbonyl compounds may comprise a polyisobutenyl-substituted succinic acid or succinic anhydride. Such compounds are suitably as described in relation to the hydrocarbyl-substituted acylating agent of the nitrogen-containing species (i) above.

Suitable amine compounds of the formula:

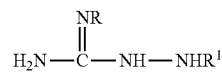

may be chosen from guanidines and aminoguanidines or salts thereof wherein R and $R^1$ are as defined above. Accordingly, the amine compound may be chosen from the inorganic salts of guanidines, such as the halide, carbonate, nitrate, phosphate, and orthophosphate salts of guanidines. The term "guanidines" refers to guanidine and guanidine derivatives, such as aminoguanidine. In one embodiment, the guanidine compound for the preparation of the additive is aminoguanidine bicarbonate. Aminoguanidine bicarbonates are readily obtainable from commercial sources, or can be prepared in a well-known manner.

Further preferred features of embodiments in which component (b) comprises detergent additive (v) are as defined in US2009/0282731.

Suitable treat rates of (a) the quaternary ammonium salt additive and (b) the one or more further nitrogen-containing detergents may depend on the type of fuel used and different levels of additive may be needed to achieve different levels of performance.

Suitably the quaternary ammonium salt additive (a) is present in the diesel fuel composition in an amount of from 0.1 to 10000 ppm, preferably from 1 to 1000 ppm, preferably from 5 to 500 ppm, for example 5 to 250 ppm or 5 to 100 ppm.

Suitably the additive (b) is present in the diesel fuel composition in an amount of from 0.1 to 10000 ppm, preferably from 1 to 1000 ppm, preferably from 5 to 500 ppm. Preferably from 5 to 250 ppm, for example 5 to 100 ppm.

Each of additive (a) and additive (b) may be provided as a mixture of compounds. The above amounts refer to the total of all such compounds present in the composition.

For the avoidance of doubt the above amounts refer to the amount of active additive compound present in the composition and ignore any impurities, solvents or diluents which may be present.

The weight ratio of additive (a) to additive (b) is preferably from 1:10 to 10:1, preferably from 1:4 to 4:1, more preferably from 1:2 to 2:1.

In some embodiments the diesel fuel composition comprises from 0.1 to 10000 ppm, preferably from 1 to 1000 ppm, preferably from 5 to 250 ppm. for example 5 to 100 ppm of (a) a quaternary ammonium salt additive and from 0.1 to 10000 ppm, preferably from 1 to 1000 ppm, preferably from 5 to 250 ppm, for example 5 to 100 ppm, of the product of (i) a Mannich reaction between an aldehyde, an amine and an optionally substituted phenol.

In some embodiments the diesel fuel composition comprises from 0.1 to 10000 ppm, preferably from 1 to 1000 ppm, preferably from 5 to 250 ppm, for example 5 to 100 ppm of (a) a quaternary ammonium salt additive and from 0.1 to 10000 ppm, preferably from 1 to 1000 ppm, preferably from 5 to 250 ppm, for example 5 to 100 ppm of (ii) the reaction product of a carboxylic acid-derived acylating agent and an amine.

In some embodiments the diesel fuel composition comprises from 0.1 to 10000 ppm, preferably from 1 to 1000 ppm, preferably from 5 to 250 ppm, for example 5 to 100 ppm of (a) a quaternary ammonium salt additive and from 0.1 to 10000 ppm, preferably from 1 to 1000 ppm, preferably from 5 to 250 ppm, for example 5 to 100 ppm of (v). the reaction product of a hydrocarbyl-substituted dicarboxylic acid or anhydride and an amine compound or salt which product comprises at least one amino triazole group.

In some embodiments the diesel fuel composition comprises from 0.1 to 10000 ppm, preferably from 1 to 1000 ppm, preferably from 5 to 500 ppm, for example 5 to 100 ppm of (a) a quaternary ammonium salt additive; from 0.1 to 10000 ppm, preferably from 1 to 1000 ppm, preferably from 5 to 500 ppm, for example 5 to 100 ppm of the product of (i) a Mannich reaction between an aldehyde, an amine and an optionally substituted phenol; and from 0.1 to 10000 ppm, preferably from 1 to 1000 ppm, preferably from 5 to 500 ppm, for example 5 to 100 ppm of (ii) the reaction product of a carboxylic acid-derived acylating agent and an amine.

When additive (b) comprises (i) and (ii) the weight ratio of additive (a) to additive (i) to additive (ii) is preferably 1 part (a) to 0.1 to 10 parts (i) to 0.1 to 10 parts (ii).

In some embodiments the diesel fuel composition comprises from 0.1 to 10000 ppm, preferably from 1 to 1000 ppm, preferably from 5 to 500 ppm, for example 5 to 100 ppm of (a) a quaternary ammonium salt additive; from 0.1 to 10000 ppm, preferably from 1 to 1000 ppm, preferably from 5 to 500 ppm, for example 5 to 100 ppm of the product of (i) a Mannich reaction between an aldehyde, an amine and an optionally substituted phenol; and from 0.1 to 10000 ppm, preferably from 1 to 1000 ppm, preferably from 5 to 500 ppm, for example 5 to 100 ppm of comprise (v) the reaction product of a hydrocarbyl-substituted dicarboxylic acid or anhydride and an amine compound or salt which product comprises at least one amino triazole group.

When additive (b) comprises (i) and (v) the weight ratio of additive (a) to additive (i) to additive (v) is preferably 1 part (a) to 0.1 to 10 parts (i) to 0.1 to 10 parts (ii).

In some embodiments the diesel fuel composition comprises from 0.1 to 10000 ppm, preferably from 1 to 1000 ppm, preferably from 5 to 500 ppm, for example 5 to 100 ppm of (a) a quaternary ammonium salt additive; from 0.1 to 10000 ppm, preferably from 1 to 1000 ppm, preferably from 5 to 500 ppm, for example 5 to 100 ppm of the product of comprise (v) the reaction product of a hydrocarbyl-substituted dicarboxylic acid or anhydride and an amine compound or salt which product comprises at least one amino triazole group; and from 0.1 to 10000 ppm, preferably from 1 to 1000 ppm, preferably from 5 to 500 ppm, for example 5 to 100 ppm of (ii) the reaction product of a carboxylic acid-derived acylating agent and an amine.

When additive (b) comprises (v) and (ii) the weight ratio of additive (a) to additive (v) to additive (ii) is preferably 1 part (a) to 0.1 to 10 parts (i) to 0.1 to 10 parts (ii).

The diesel fuel composition used in the present invention may include one or more further additives such as those which are commonly found in diesel fuels. These include, for example, antioxidants, additional dispersants/detergents, metal deactivating compounds, wax anti-settling agents, cold flow improvers, cetane improvers, dehazers, stabilisers, demulsifiers, antifoams, corrosion inhibitors, lubricity improvers, dyes, markers, combustion improvers, metal deactivators, odour masks, drag reducers and conductivity improvers. Examples of suitable amounts of each of these types of additives will be known to the person skilled in the art.

By diesel fuel we include any fuel suitable for use in a diesel engine, either for road use or non-road use. This includes, but is not limited to, fuels described as diesel, marine diesel, heavy fuel oil, industrial fuel oil etc.

The diesel fuel composition of the present invention may comprise a petroleum-based fuel oil, especially a middle distillate fuel oil. Such distillate fuel oils generally boil within the range of from 110° C. to 500° C., e.g. 150° C. to 400° C. The diesel fuel may comprise atmospheric distillate or vacuum distillate, cracked gas oil, or a blend in any proportion of straight run and refinery streams such as thermally and/or catalytically cracked and hydro-cracked distillates.

The diesel fuel composition used in the present invention may comprise non-renewable Fischer-Tropsch fuels such as those described as GTL (gas-to-liquid) fuels, CTL (coal-to-liquid) fuels and OTL (oil sands-to-liquid).

The diesel fuel composition used in the present invention may comprise a renewable fuel such as a biofuel composition or biodiesel composition.

The diesel fuel composition may comprise 1st generation biodiesel. First generation biodiesel contains esters of, for example, vegetable oils, animal fats and used cooking fats. This form of biodiesel may be obtained by transesterification of oils, for example rapeseed oil, soybean oil, safflower oil, palm oil, corn oil, peanut oil, cotton seed oil, tallow, coconut oil, physic nut oil (Jatropha), sunflower seed oil, used cooking oils, hydrogenated vegetable oils or any mixture thereof, with an alcohol, usually a monoalcohol, in the presence of a catalyst.

The diesel fuel composition may comprise second generation biodiesel. Second generation biodiesel is derived from renewable resources such as vegetable oils and animal fats and processed, often in the refinery, often using hydro-processing such as the H-Bio process developed by Petrobras. Second generation biodiesel may be similar in properties and quality to petroleum based fuel oil streams, for example renewable diesel produced from vegetable oils, animal fats etc. and marketed by ConocoPhillips as Renewable Diesel and by Neste as NExBTL.

The diesel fuel composition used in the present invention may comprise third generation biodiesel. Third generation biodiesel utilises gasification and Fischer-Tropsch technology including those described as BTL (biomass-to-liquid) fuels. Third generation biodiesel does not differ widely from some second generation biodiesel, but aims to exploit the whole plant (biomass) and thereby widens the feedstock base.

The diesel fuel composition may contain blends of any or all of the above diesel fuel compositions.

In some embodiments the diesel fuel composition used in the present invention may be a blended diesel fuel comprising bio-diesel. In such blends the bio-diesel may be present in an amount of, for example up to 0.5%, up to 1%, up to 2%, up to 3%, up to 4%, up to 5%, up to 10%, up to 20%, up to 30%, up to 40%, up to 50%, up to 60%, up to 70%, up to 80%, up to 90%, up to 95% or up to 99%.

In some embodiments the diesel fuel composition may comprise a secondary fuel, for example ethanol. Preferably however the diesel fuel composition does not contain ethanol.

The diesel fuel composition of the present invention may contain a relatively high sulphur content, for example greater than 0.05% by weight, such as 0.1% or 0.2%.

However in preferred embodiments the diesel fuel has a sulphur content of at most 0.05% by weight, more preferably of at most 0.035% by weight, especially of at most 0.015%. Fuels with even lower levels of sulphur are also suitable such as, fuels with less than 50 ppm sulphur by weight, preferably less than 20 ppm, for example 10 ppm or less.

As mentioned above, various metal species may be present in fuel compositions. This may be due to contamination of the fuel during manufacture, storage, transport or use or due to contamination of fuel additives. Metal species may also be added to fuels deliberately. For example transition metals are sometimes added as fuel borne catalysts, for example to improve the performance of diesel particulate filters.

The present inventors believe that problems of injector sticking occur when metal or ammonium species, particularly sodium species, react with carboxylic acid species in the fuel.

Sodium contamination of diesel fuel and the resultant formation of carboxylate salts is believed to be a major cause of injector sticking.

In preferred embodiments the diesel fuel compositions used in the present invention comprise sodium and/or calcium. Preferably they comprise sodium. The sodium and/or calcium is typically present in a total amount of from 0.01 to 50 ppm, preferably from 0.05 to 5 ppm preferably 0.1 to 2 ppm such as 0.1 to 1 ppm.

Other metal-containing species may also be present as a contaminant, for example through the corrosion of metal and metal oxide surfaces by acidic species present in the fuel or from lubricating oil. In use, fuels such as diesel fuels routinely come into contact with metal surfaces for example, in vehicle fueling systems, fuel tanks, fuel transportation means etc. Typically, metal-containing contamination may comprise transition metals such as zinc, iron and copper; other group I or group II metals and other metals such as lead.

The presence of metal containing species may give rise to fuel filter deposits and/or external injector deposits including injector tip deposits and/or nozzle deposits.

In addition to metal-containing contamination which may be present in diesel fuels there are circumstances where metal-containing species may deliberately be added to the fuel. For example, as is known in the art, metal-containing fuel-borne catalyst species may be added to aid with the regeneration of particulate traps. The presence of such catalysts may also give rise to injector deposits when the fuels are used in diesel engines having high pressure fuel systems.

Metal-containing contamination, depending on its source, may be in the form of insoluble particulates or soluble compounds or complexes. Metal-containing fuel-borne catalysts are often soluble compounds or complexes or colloidal species.

In some embodiments, the diesel fuel may comprise metal-containing species comprising a fuel-borne catalyst. Preferably, the fuel borne catalyst comprises one or more metals selected from iron, cerium, platinum, manganese, Group I and Group II metals e.g., calcium and strontium. Most preferably the fuel borne catalyst comprises a metal selected from iron and cerium.

In some embodiments, the diesel fuel may comprise metal-containing species comprising zinc. Zinc may be present in an amount of from 0.01 to 50 ppm, preferably from 0.05 to 5 ppm, more preferably 0.1 to 1.5 ppm.

Typically, the total amount of all metal-containing species in the diesel fuel, expressed in terms of the total weight of metal in the species, is between 0.1 and 50 ppm by weight, for example between 0.1 and 20 ppm, preferably between 0.1 and 10 ppm by weight, based on the weight of the diesel fuel.

The present invention relates to combating internal diesel injector deposits or IDIDs in the injectors of a severely fouled engine.

This problem typically occurs in modern diesel engines having a high pressure fuel system. Preferably the diesel engine has a fuel injection system which comprises a high pressure fuel injection (HPFI) system. The fuel pressure may be greater than 1350 bar, for example greater than 1500 bar or greater than 2000 bar. Preferably, the diesel engine has fuel injection system which comprises a common rail injection system or a unit injection system for example a piezo-electric injector. The skilled person will have a good knowledge of such engines. In the common rail injection system fuel is compressed utilizing a high-pressure pump that supplies it to the fuel injection valves through a common rail. In the unit injection system the high-pressure pump and fuel injection valve are integrated in one assembly. Preferably, the diesel engine has a fuel injection system which comprises a common rail injection system.

Such diesel engines may be characterised in a number of ways.

Such engines are typically equipped with fuel injection equipment meeting or exceeding "Euro 5" emissions legislation or equivalent legislation in US or other countries.

Such engines are typically equipped with fuel injectors having a plurality of apertures, each aperture having an inlet and an outlet.

Such engines may be characterised by apertures which are tapered such that the inlet diameter of the spray-holes is greater than the outlet diameter.

Such modern engines may be characterised by apertures having an outlet diameter of less than 500 µm, preferably less than 200 µm, more preferably less than 150 µm, preferably less than 100 µm, most preferably less than 80 µm or less.

Such modern diesel engines may be characterised by apertures where an inner edge of the inlet is rounded.

Such modern diesel engines may be characterised by the injector having more than one aperture, suitably more than 2 apertures, preferably more than 4 apertures, for example 6 or more apertures.

Such modern diesel engines may be characterised by an operating tip temperature in excess of 250° C.

Such modern diesel engines may be characterised by a fuel injection system which provides a fuel pressure of more than 1350 bar, preferably more than 1500 bar, more preferably more than 2000 bar. Preferably, the diesel engine has fuel injection system which comprises a common rail injection system.

The method and use of the present invention preferably improves the performance of an engine having one or more of the above-described characteristics.

The present invention may clean up internal diesel injector deposits caused by lacquers and/or carboxylate residues.

The present invention may clean up internal diesel injector deposits caused by amide lacquers and/or carboxylate residues.

The present invention may clean up internal diesel injector deposits caused by lacquers.

The present invention may clean up internal diesel injector deposits caused by amide lacquers.

Preferably the present invention clean up internal diesel injector deposits caused by carboxylate residues. Carboxylate residues are typically present as metal or ammonium salts.

The present invention is particularly useful in the prevention or reduction or removal of internal deposits in injectors of engines operating at high pressures and temperatures in which fuel may be recirculated and which comprise a plurality of fine apertures through which the fuel is delivered to the engine. The present invention finds utility in engines for heavy duty vehicles and passenger vehicles. Passenger vehicles incorporating a high speed direct injection (or HSDI) engine may for example benefit from the present invention.

The present invention provides a method and use for cleaning up internal diesel injector deposits in a severely fouled engine.

"Clean-up" of a fouled engine may provide significant advantages. For example, superior clean up may lead to an increase in power and/or an increase in fuel economy and/or reduced emissions. In addition removal of deposits from an engine, in particular from injectors may lead to an increase in interval time before injector maintenance or replacement is necessary thus reducing maintenance costs.

In some preferred embodiments, clean up may also provide a power increase. Thus a fouled engine may be treated to remove the existing deposits and provide an additional power gain. The removal of IDIDs according to the present invention will lead to an improvement in performance of the engine.

The improvement in performance of the diesel engine system may be measured by a number of ways.

"Clean up" performance can be observed by an improvement in performance of an already fouled engine.

The effectiveness of fuel additives is often assessed using a controlled engine test.

In Europe the Co-ordinating European Council for the development of performance tests for transportation fuels, lubricants and other fluids (the industry body known as CEC), has developed a number of tests for additives for modern diesel engines such as HSDI engines. One test which has been developed is commonly known as the DW10C test. This test assesses the ability of a fuel composition to prevent the formation of IDIDs that lead to injector sticking.

The DW10C test procedure was developed by CEC as a "keep clean" procedure test and thus may be used to measure the "keep clean" performance of an engine. However it is often modified and used as a clean up procedure and thus can also be used to measure the "clean up" performance of an engine.

The DW10C test is described in example 12. Reference herein to the DW10C test means the test method described in example 12. A modified version of this test adapted to measure clean up, is described in example 13. This modified test was used to test the additives of the invention.

In the DW10C test the performance of the engine is rated using a merit score. The maximum score is 10 and a score in excess of 9.5 indicates an exceptional performance. A score of less than 8 indicates that the engine is severely fouled and likely contains very high levels of IDIDs.

Very surprisingly additive combinations according to the present invention have been found to perform exceptionally well in the DW10C test when used to clean up a severely fouled engine.

By a severely fouled engine we mean to refer to an engine which would achieve a merit rating of less than 8 In the DW10C test.

In particular the method and use of the present invention can clean up IDIDs from an engine with a level of fouling equivalent to a rating of less than 8 in the DW10C test.

Preferably the use and method according to the present invention provide a score in a DW10C clean up test in excess of 9.8, preferably in excess of 9.9 when introduced to an engine having a merit score of less than 8, following the treatment with an equivalent fuel absent the additive. As is described in example 8, some additive combinations of the present invention may achieve a score of 10 in the DW10C test when used to clean up an engine with a level of fouling to give a merit score of less than 8, for example less than 7.8 or less than 7.6, following treatment with an equivalent fuel absent the additive.

The present invention may also provide improved performance in modern diesel engines having a high pressure fuel system by controlling external injector deposits, for example those occurring in the injector nozzle and/or at the injector tip. The ability to provide control of internal injector deposits and external injector deposits is a useful advantage of the present invention.

Suitably the present invention may reduce or prevent the formation of external injector deposits. It may therefore provide "keep clean" performance in relation to external injector deposits.

Suitably the present invention may reduce or remove existing external injector deposits. It may therefore provide "clean up" performance in relation to external injector deposits.

In some preferred embodiments the present invention involves the combination of 5 to 100 ppm of (a) a quaternary ammonium salt additive and 5 to 100 ppm of one or more nitrogen containing detergents selected from:
(i) the product of a Mannich reaction between an aldehyde, an amine and an optionally substituted phenol;
(ii) the reaction product of a carboxylic acid-derived acylating agent and an amine; and
(v) the reaction product of a hydrocarbyl-substituted dicarboxylic acid or anhydride and an amine compound or salt which product comprises at least one amino triazole group.

In some preferred embodiments the present invention involves the combination of 5 to 100 ppm of (a) a quaternary ammonium salt additive; 5 to 100 ppm of (i) the product of a Mannich reaction between an aldehyde, an amine and an optionally substituted phenol; and 5 to 100 ppm of (ii) the reaction product of a carboxylic acid-derived acylating agent and an amine.

In some preferred embodiments the present invention involves the combination of 5 to 100 ppm of (a) a quaternary ammonium salt additive; 5 to 100 ppm of (ii) the reaction product of a carboxylic acid-derived acylating agent and an amine; and (v) the reaction product of a hydrocarbyl-substituted dicarboxylic acid or anhydride and an amine compound or salt which product comprises at least one amino triazole group.

The invention will now be further defined with reference to the following non-limiting examples.

Raw Materials

The polyisobutylene used in the synthesis examples was purchased under the trade mark HRPB1000 (Daelim, South Korea) and had a number average molecular weight ($M_n$) of approximately 1,000 and a terminal vinylidene content ≥80% ($^{13}C$ NMR).

Analytical Methods

The acid value of PIBSA was determined by non-aqueous titration against lithium methoxide solution (ca 0.1 M in toluene/methanol) using thymol blue (0.4% w/v in 1,4-dioxane) as the indicator. The titre of lithium methoxide solutions was regularly confirmed by titration against analytical grade benzoic acid.

The residual maleic anhydride content of polyisobutylenesuccinic anhydride (PIBSA) was measured by quantitative FTIR against a calibration curve. The characteristic absorbance at 696 $cm^{-1}$ was used for the analysis.

The residual (unreacted) polyisobutylene content of polyisobutylenesuccinic anhydride (PIBSA) was measured by quantitative HPLC against a polyisobutylene standard, under normal phase column conditions (eluent: isohexane).

The 'P value' (average number of succinyl residues per polyisobutylene side chain, in the sample) is calculated as follows:

$$P = \frac{\text{Acid value} \times PIB\ \text{MW}}{(20(100 - PIB\ \text{content}) - (\text{Acid Value} * 98.06)}$$

Where "PIB MW" is the number average molecular weight (Mn) and PIB content is the residual (unreacted) polyisobutylene content as described above.

The derivation of this equation is described below.

PIB content is measured as a percentage by weight (g/100 g).

Acid value (AV) Is recorded as the number of acid groups (mmol) per gram of sample.

x=mmol monomalosted PIBSA/g
y=mmol biemaleated PIBSA/g $$x + 2y = 1/2 AV$$

$$2x + 4y = AV$$

$$x = \frac{(AV - 4y)}{2}$$

$$(MW + 98)x + (MW + 196)y = 10(100 - PIB) [\text{units each side mg/g}]$$

$$(MW + 98)(AV - 4y) + 2(MW + 196)y = 20(100 - PIB)$$

$$(MW + 98)AV - 4y(MW + 196) + 2(MW + 196)y = 20(100 - PIB)$$

$$(MW + 98)AV - 20(100 - PIB) =$$

$$4y(MW + 98) - 2(MW + 196)y = 4yMW + 392y - 2yMW - 392y$$

$$y = \frac{(MW + 98)AV - 20(100 - PIB)}{2MW}$$

$$P = \frac{x + 2y}{x + y} = \frac{x + 2y}{(x + 2y) - y} = \frac{1/2 AV}{1/2 AV - \frac{(MW + 98)AV - 20(100 - PIB)}{2MW}}$$

$$P = \frac{AV}{AV - \left(\frac{AV(mw + 98) - 20(100 - PIB)}{mw}\right)}$$

$$P = \frac{AV \cdot mw}{AV \cdot mw - AV \cdot mw - AV \cdot 98 + 20(100 - PIB)}$$

$$P = \frac{AV \cdot mw}{20(100 - PIB) - (AV \cdot 98)}$$

Example 1—Preparation of Polyisobutylenesuccinic Anhydride (PIBSA)-Inventive 700 g (0.7 mol) of polyisobutylene (Mn 1000) was charged to a nitrogen flushed, jacketed reactor fitted with an overhead stirrer. The starting material was heated to 120° C. with stirring and nitrogen inerting was repeated. The reaction temperature was increased to 190° C. and maleic anhydride (82.4 g, 0.84 mol, 1.2 eq) was charged over 1 hour. After maintaining a temperature of 190° C. for a further 1 hour, the temperature was increased to 200-208° C. and held in this range for 8 hours. Vacuum (<30 mbar) was then applied for 2.5 hrs, whilst maintaining the reaction temperature, which reduced the level of residual maleic anhydride to ≤0.05 wt %. The reaction mass was cooled to $80° C. then discharged from the reactor.

Example 2—Preparation of PIBSA-Comparative

The synthesis procedure was substantially identical to Example 1 and used the same grade of polyisobutylene ($M_n$ 1000). The charge of maleic anhydride was reduced (1 eq relative to polyisobutylene) and the reaction was held between 190-210° C. during the 8 hour heating period. Residual maleic anhydride was also measured as ≤0.05 wt %.

The properties of the reaction products of Examples 1 and 2 are summarised in Table 1.

TABLE 1

| Example | Acid value (mmolH + /g) | Unreacted PIB (wt %) | Molecular weight of PIB starting material (Mn) | P value |
|---|---|---|---|---|
| 1 | 1.89 | 18.5 | 1000 | 1.31 |
| 2 | 1.68 | 20.2 | 1000 | 1.17 |

Example 3—Additive Q1-Inventive

PIBSA prepared according to Example 1 was charged to a nitrogen flushed, jacketed reactor fitted with an overhead stirrer and heated to 120° C. 3-(dimethylamino) propylamine (DMAPA) (1 eq relative to anhydride groups) was charged slowly, maintaining the reaction temperature between 120-130° C. After stirring at 120° C. for a further 1 hr, the reaction temperature was increased to 140° C. and held for 3 hrs with concurrent distillation of water. Methyl salicylate (2.1 eq relative to anhydride groups) was added in a single portion and heating was continued at 140° C. for 10 hours. The reaction mass was diluted with Aromatic 150 solvent to provide an overall solids content of 60 wt % prior to discharging from the reactor.

Example 4—Additive Q2-Comparative

PIBSA prepared according to Example 2 was charged to a nitrogen flushed, jacketed reactor fitted with an overhead stirrer and heated to 90° C. 3-(dimethylamino)propylamine (DMAPA) (1 eq relative to anhydride groups) was charged slowly, maintaining the reaction temperature between 90-100° C. After stirring at 90-100° C. for a further 1 hr, the reaction temperature was increased to 140° C. and held for 4 hrs with concurrent distillation of water. 2-ethylhexanol was added to adjust the solids content to 60 wt % then methyl salicylate (1 eq relative to anhydride groups) was added in a single portion and heating was continued at 140° C. for 15 hours. The reaction mass was cooled to 60° C. prior to discharging from the reactor.

Example 5—Preparation of DMAPA Polyisobutylene Succinimide Propylene Oxide/Acetic Acid Quaternary Ammonium Salt—Inventive PIBSA according to Example 1 was charged to a nitrogen flushed, jacketed reactor fitted with an overhead stirrer and heated to 120° C. 3-(dimethylamino) propylamine (DMAPA) (1 eq relative to anhydride groups) was charged slowly, maintaining the reaction temperature between 120-130° C. After stirring at 120° C. for a further 1 hr, the reaction temperature was increased to 140° C. and held for 3 hrs with concurrent distillation of water. The reaction mass was cooled to room temperature, then acetic acid (0.71 eq relative to anhydride groups), 2-ethylhexanol (1.34 eq relative to anhydride groups) and water (0.81 eq relative to anhydride groups) were added. The reaction mass was heated to 75° C. and propylene oxide (2.39 eq relative to anhydride groups) was added over 3 hrs via a dropping funnel. Heating was continued for 4 hrs. The reaction mass was diluted with Aromatic 150 solvent to provide an overall solids content of 60 wt % prior to discharging from the reactor.

Example 6—Preparation of DMAPA Polyisobutylene Succinimide Propylene Oxide/Acetic Acid Quaternary Ammonium Salt—Comparative PIBSA according to Example 2 was used. Formation of the DMAPA succinimide and subsequent quaternization using propylene oxide/AcOH was carried out in identical manner to Example 5. Reactant charges were calculated relative to anhydride groups in the PIBSA starting material.

Example 7—Preparation of DMAPA Polyisobutylene Succinamide Propylene Oxide Quaternary Ammonium Salt—Inventive PIBSA according to Example 1 (1 part) and Caromax 20 (1 part) were charged to a nitrogen flushed, jacketed reactor fitted with an overhead stirrer and heated to 80° C. to ensure proper mixing, then cooled to room temperature. 3-(dimethylamino) propylamine (DMAPA) (1 eq relative to anhydride groups in the PIBSA starting material) was added over 3 hrs, maintaining the reaction temperature below 40° C. The reaction mass was stirred for a further 4 hrs, then propylene oxide (2 eq relative to anhydride groups) was added over 3 hrs, then the reaction mass stirred at room temperature for 4 hrs. After nitrogen sparging to remove residual propylene oxide, the reaction mass was discharged from the reactor.

Example 8—Preparation of DMAPA Polyisobutylene Succinamide Propylene Oxide Quaternary Ammonium Salt—Comparative PIBSA according to Example 2 was used. Formation of the DMAPA succinamide and subsequent quaternization using propylene oxide was carried out in identical manner to Example 7. Reactant charges were calculated relative to anhydride groups.

Example 9—Additive A1

Additive A1, a Mannich reaction product additive of the prior art was prepared as follows:

A 1 L reactor was charged with dodecylphenol (170.6 g, 0.65 mol), ethylenediamine (30.1 g, 0.5 and Caromax 20 (123.9 g). The mixture was heated to 95° C. and formaldehyde solution, 37 wt % (73.8 g, 0.9 mol) charged over 1 hour. The temperature was increased to 125° C. for 3 hours and water removed. In this example the molar ratio of aldehyde (a):amine (b):phenol (c) was approximately 1.8:1:1.3.

Example 10—Additive A2

Additive A2 is a 60 wt % active ingredient solution (in aromatic solvent) of a polyisobutenyl succinimide obtained from the condensation reaction of a polyisobutenyl succinic anhydride (PIBSA) derived from polyisobutene of Mn approximately 750 with a polyethylene polyamine mixture of average composition approximating to tetraethylene pentamine. The product was obtained by mixing the PIBSA and polyethylene polyamine at 50° C. under nitrogen and heating at 160° C. for 5 hours with removal of water.

Example 11

Fuel compositions were prepared by adding additives Q1, Q2, A1 and A2 to diesel fuel.

The diesel fuel complied with the RF06 base fuel, the details of which are given in table 1 below.

TABLE 1

| Property | Units | Limits Min | Limits Max | Method |
|---|---|---|---|---|
| Cetane Number | | 52.0 | 54.0 | EN ISO 5165 |
| Density at 15° C. | kg/m$^3$ | 833 | 837 | EN ISO 3675 |
| Distillation | | | | |
| 50% v/v Point | ° C. | 245 | — | |
| 95% v/v Point | ° C. | 345 | 350 | |
| FBP | ° C. | — | 370 | |
| Flash Point | ° C. | 55 | — | EN 22719 |
| Cold Filter Plugging Point | ° C. | — | −5 | EN 116 |
| Viscosity at 40° C. | mm$^2$/sec | 2.3 | 3.3 | EN ISO 3104 |
| Polycyclic Aromatic Hydrocarbons | % m/m | 3.0 | 6.0 | IP 391 |
| Sulphur Content | mg/kg | — | 10 | ASTM D 5453 |
| Copper Corrosion | | — | 1 | EN ISO 2160 |
| Conradson Carbon Residue on 10% Dist. Residue | % m/m | — | 0.2 | EN ISO 10370 |
| Ash Content | % m/m | — | 0.01 | EN ISO 6245 |
| Water Content | % m/m | — | 0.02 | EN ISO 12937 |
| Neutralisation (Strong Acid) Number | mg KOH/g | — | 0.02 | ASTM D 974 |
| Oxidation Stability | mg/mL | — | 0.025 | EN ISO 12205 |
| HFRR (WSD1,4) | μm | — | 400 | CEC F-06-A-96 |
| Fatty Acid Methyl Ester | | | prohibited | |

Example 12

The ability of additives of the invention to remove 'Internal Diesel Injector Deposits' (IDIDs) may be measured according to the test method CEC F-110-16, available from the Co-ordinating European Council. The test uses the PSA DW10C engine.

The engine characteristics as follows:

| | |
|---|---|
| Design: | Four cylinders in line, overhead camshaft, variable geometry turbocharger with EGR |
| Capacity: | 1997 cm$^3$ |
| Combustion chamber: | Four valves, bowl in piston, direct injection |
| Power: | 120 kW @ 3750 rpm |
| Torque: | 340 Nm @ 2000 rpm |
| Injection system: | Common rail with solenoid type injectors Delphi Injection System |
| Emissions control: | Conforms to Euro V limit values when combined with exhaust gas post-treatment system. |

The test fuel (RF06) is dosed with 0.5 mg/kg Na in the form of Sodium Naphthenate+10 mg/kg Dodecyl Succinic Acid (DDSA).

The test procedure consists of main run cycles followed by soak periods, before cold starts are carried out.

The main running cycle consist of two speed and load set points, repeated for 6 hrs, as seen below and in FIG. 1.

| Step | Speed (rpm) | Torque (N · m) | Duration (s) |
|---|---|---|---|
| 1 | 3750 | 280 | 1470 |
| 1 - Ramp → 2 | — | — | 30 |
| 2 | 1000 | 10 | 270 |
| 2 - Ramp → 1 | — | — | 30 |

The ramp times of 30 seconds are included in the duration of each step.

During the main run, parameters including, Throttle pedal position, ECU fault codes, Injector balance coefficient and Engine stalls are observed and recorded.

The engine is then left to soak at ambient temperature for 8 hrs.

After the soak period the engine is re-started. The starter is operated for 5 seconds; if the engine fails to start the engine is left for 60 seconds before a further attempt. A maximum of 5 attempts are allowed.

If the engine starts the engine is allowed to idle for 5 minutes. Individual exhaust temperatures are monitored and the maximum Temperature Delta is recorded. An increased variation in Cylinder-to-Cylinder exhaust temperatures is a good indication that injectors are suffering from IDID. Causing them to either open slowly or stay open to long.

Figure 2:
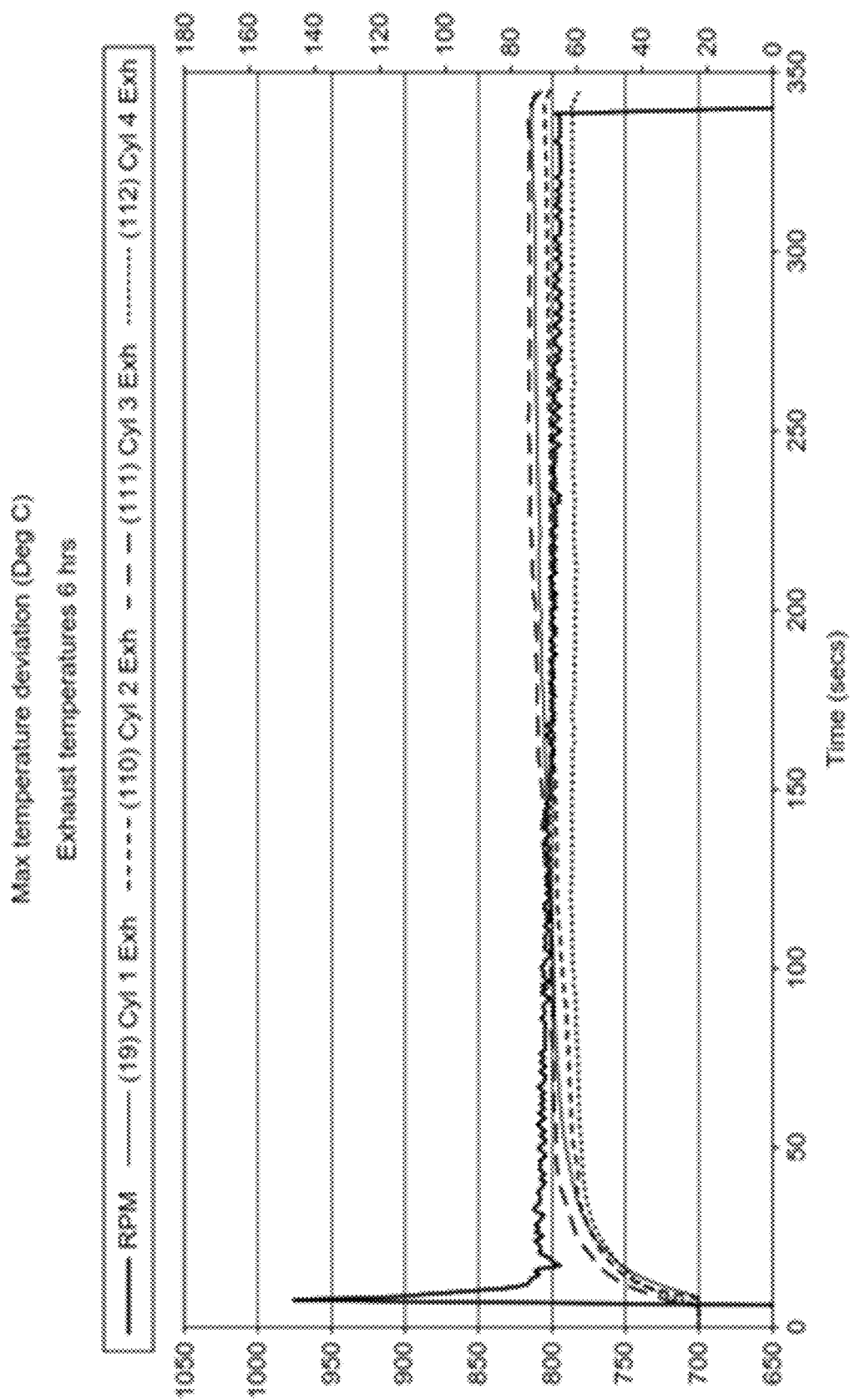
FIG. 2 illustrates exhaust temperatures according to Example 12.

An example, shown in FIG. 2, of all exhaust temperatures with <30° C. deviation, indicating no sticking caused by IDID.

The complete test comprises of 6× Cold Starts, although the Zero hour Cold Start does not form part of the Merit Rating and 5× 6 hr Main run cycles, giving a total of 30 hrs engine running time.

The recorded data is inputted into the Merit Rating Chart. This allows a Rating to be produced for the test. Maximum rating of 10 shows no issues with the running or operability of the engine for the duration of the test.

An example below:

| | | Cold start | | | | | | | |
|---|---|---|---|---|---|---|---|---|---|
| | | Starting | | | | Exhaust temperature consistency | | | |
| Cold start | Start Y/N | Maximus Merits | Number of attempts (1 = first start) | Deduction | Merits | Maximums Merits | Exhaust temperature Max cyl. Deviation (° C.) | Deduction | Merits |
| #0 | | | | | not rated | | | | |
| #1 | Y | 5 | 1 | 0 | 5 | 5 | 21.8 | 0 | 5 |
| #2 | Y | 5 | 1 | 0 | 5 | 5 | 18.1 | 0 | 5 |

-continued

| | | | | | | | | | |
|---|---|---|---|---|---|---|---|---|---|
| #3 | Y | 5 | 1 | 0 | 5 | 5 | 15.5 | 0 | 5 |
| #4 | Y | 5 | 1 | 0 | 5 | 5 | 20.2 | 0 | 5 |
| #5 | Y | 5 | 1 | 0 | 5 | 5 | 22.6 | 0 | 5 |
| Total merits | | | | | 25 | | | | 25 |

Main run Operability

| Main run | Maximum Merits | Number of ECU Fault resets | Deduction | Stall (Y/N) | Deduction | Max pedal position at 1000 rpm/10 N·m (%) | Deduction | Max inject. Balancing Coeff. (rpm) | Deduction | Merits |
|---|---|---|---|---|---|---|---|---|---|---|
| #1 | 5 | 0 | 0 | N | 0 | 15.4 | 0 | 15 | 0 | 5 |
| #2 | 5 | 0 | 0 | N | 0 | 13.5 | 0 | 15 | 0 | 5 |
| #3 | 5 | 0 | 0 | N | 0 | 13.6 | 0 | 16 | 0 | 5 |
| #4 | 5 | 0 | 0 | N | 0 | 13.8 | 0 | 15 | 0 | 5 |
| #5 | 5 | 0 | 0 | N | 0 | 14.5 | 0 | 15 | 0 | 5 |
| | | | | | | | | | | 25 |
| | | | | | | Global Rating - Summary (Merit/10) | | | | 10 |

The propensity of the test fuel to cause injector deposits (IDID) is evaluated through the following criteria:
Cold Start Parameters:
  1. Number of failed starts.
  2. Exhaust temperature deviation from standard value for cylinders 1 to 4
Main Run Parameters
  1. Number of engine stalls
  2. Number of IDID related ECU faults generated during main run
  3. Pedal position drift on low speed phases
  4. Injector balancing
Note: 1st Cold start (#0) is run with Flush fuel and is not rated
The rating can be summarized as follows:
1/Cold Start (for start #1 to #5):
Startability rating:
  1st start: merit=5/each fail brings a "−1" merit discount.
Maximum Exhaust Ports Temperature deviation rating:
  merit=5 if T<30° C./2 if 30° C.<T<50° C./0 if T>50° C.
  Cold Start Rating range: 0→10 for each Cold Start (5 Cold Starts rated in total)
2/Main Run (for run #1 to #5):
Operability Rating:
  merit=5 if no stall and no IDID related ECU Fault, each IDID related ECU fault brings a "−1" merit discount (after 5th ECU Fault Reset→Next cold start).
  merit=0 if stall (Then→Next Cold Start).
Maximum Pedal Position:
  merit=5 if P<25%/2 if 25%<P<40%/0 if P>40%
Maximum Injector Balancing Factor deduction:
  merit=5 if IB<20 rpm/2 if 30 rpm<IB<20 rpm/0 if IB>30 rpm
  Main Run Rating range: 0→5 for each Main Run (5 in total)
Maximum global rating value: 75 (ie: 5×10+5×5).
Global rating=10×(Cold Start+Main Run Rating values)/75
Resulting in 0 to 10 merit scale Example 13

The ability of additives of the invention to clean up IDIDs was assessed according to a modification of the DW10C test described in example 12.

The In-House Clean-Up Method developed starts by running the engine using reference diesel (RF06) dosed with 0.5 mg/kg Na+10 mg/Kg DDSA until an exhaust temperature Delta of >50° C. is observed on the Cold Start. This has repeatedly been seen on the 3$^{rd}$ Cold Start which follows the second main run, 12 hrs total engine run time.

Once the increased Exhaust temperature Delta is observed, the engine fuel supply is swapped to reference diesel, dosed with 0.5 mg/kg Na (as sodium naphthenate)+10 mg/kg DDSA+the Candidate sample. The fuel is flushed through to the engine and allowed to commence with the next Main run.

The ability of the Candidate additive to prevent any further increase in deposits or to remove the deposits can then be determined as the test continues.

Example 14

Diesel fuel compositions were prepared comprising the additives indicated in the table below and tested according to the procedure detailed in examples 6 and 7.

The results show that the additive combination according to the invention provides excellent performance in a highly fouled engine.

| Additive Q1 (ppm active) | Additive Q2 (ppm active) | Additive A1 (ppm active) | Additive A2 (ppm active) | Dirty up rating | Clean up rating |
|---|---|---|---|---|---|
| — | 24 | 13 | 30 | 6.7 | 7.6 |
| 24 | — | 13 | 30 | 6.93 | 10 |
| 24 | — | — | 30 | 7.87 | 10 |

The invention claimed is:
1. A method of cleaning up internal diesel injector deposits in a severely fouled engine, the method comprising combusting in the engine a diesel fuel composition com- prising (a) a quaternary ammonium salt additive; and (b) one or more further nitrogen-containing detergents; wherein the quaternary ammonium salt additive comprises the quaternised reaction product of a hydrocarbyl substituted succinic acid derived acylating agent and a compound able to react with said acylating agent and which includes a tertiary amine group; wherein each molecule of the hydrocarbyl substituted succinic acid derived acylating agent includes on average at least 1.2 succinic acid moieties.

2. A diesel fuel composition comprising (a) a quaternary ammonium salt additive; and (b) one or more further nitrogen-containing detergents; wherein the quaternary ammonium salt additive comprises the quaternised reaction product of a hydrocarbyl substituted succinic acid derived acylating agent and a compound able to react with said acylating agent and which includes a tertiary amine group; wherein each molecule of the hydrocarbyl substituted succinic acid derived acylating agent includes on average at least 1.2 succinic acid moieties.

3. The method of claim 1, wherein the hydrocarbyl substituted succinic acid derived acylating agent is a polyisobutene-substituted succinic acid or succinic anhydride wherein the polyisobutene substituent has a number average molecular weight of between 450 to 2300.

4. The method of claim 1, wherein the compound able to react with the hydrocarbyl substituted succinic acid derived acylating agent and which includes a tertiary amine group comprises one or more compounds formed by the reaction of a hydrocarbyl-substituted acylating agent and an amine of formula (I) or (II):

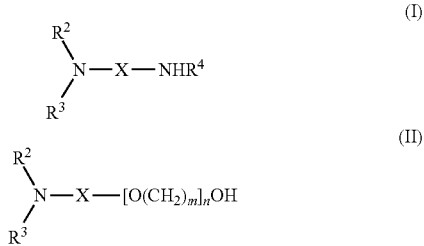

wherein $R^2$ and $R^3$ are the same or different alkyl, alkenyl, aryl, alkaryl or aralkyl groups having from 1 to 22 carbon atoms; X is an optionally substituted alkylene group having from 1 to 20 carbon atoms; n is from 0 to 20; m is from 1 to 5; and $R^4$ is hydrogen or a $C_1$ to $C_{22}$ alkyl group.

5. The method of claim 4, wherein X is a propylene group.

6. The method of claim 1, wherein the quaternary ammonium salt additive (a) is prepared by reacting the reaction product of a hydrocarbyl substitute succinic acid derived acylating agent and a compound able to react with said acylating agent and which includes a tertiary amine group with a quaternizing agent selected from the group consisting of an ester of a carboxylic acid, dialkyl sulfates, benzyl halides, hydrocarbyl substituted carbonates, hydrocarbyl substituted epoxides optionally in combination with an acid, alkyl halides, alkyl sulfonates, sultones, hydrocarbyl substituted phosphates, hydrocarbyl substituted borates, alkyl nitrites, alkyl nitrates, hydroxides, N-oxides, chloroacetic acid or salts thereof, or mixtures thereof.

7. The method of claim 1, wherein the quaternary ammonium salt additive (a) is prepared by reacting the reaction product of a hydrocarbyl substituted succinic acid derived acylating agent and a compound able to react with said acylating agent and which includes a tertiary amine group with a quaternizing agent selected from the group consisting of dialkyl sulfates, benzyl halides, hydrocarbyl substituted carbonates, hydrocarbyl substituted epoxides in combination with an acid, alkyl halides, alkyl sulfonates, sultones, hydrocarbyl substituted phosphates, hydrocarbyl substituted borates, N-oxides, chloroacetic acid or salts thereof, or mixtures thereof.

8. The method of claim 1, wherein the quaternary ammonium salt additive (a) is prepared by reacting the reaction product of a hydrocarbyl substituted succinic acid derived acylating agent and a compound able to react with said acylating agent and which includes a tertiary amine group with a quaternizing agent which is a compound of formula (III):

wherein R is an optionally substituted alkyl, alkenyl, aryl or alkylaryl group and $R^1$ is a $C_1$ to $C_{22}$ alkyl, aryl or alkylaryl group.

9. The method of claim 8, wherein the quaternizing agent is selected from dimethyl oxalate, methyl 2-nitrobenzoate and methyl salicylate.

10. The method of claim 8, wherein the quaternizing agent is an ester of a polycarboxylic acid.

11. The method of claim 1, wherein component (b) comprises (i) the product of a Mannich reaction between an aldehyde, an amine and an optionally substituted phenol.

12. The method of claim 11, wherein component (b) comprises (i) the product of a Mannich reaction between:
  (x) formaldehyde;
  (y) a polyethylene polyamine; and
  (z) a para-substituted monoalkyl phenol.

13. The method of claim 1, wherein component (b) comprises (ii) the reaction product of a carboxylic acid-derived acylating agent and an amine.

14. The method of claim 13, wherein component (ii) comprises the reaction product of a polyisobutene-substituted succinic acid or succinic anhydride and a polyethylene polyamine selected from ethylenediamine, diethylenetriamine, triethylenetetramine, tetraethylenepentamine, pentaethylenehexamine, hexaethylene-heptamine and mixtures and isomers thereof; wherein polyisobutene substituent has a number average molecular weight of between 500 and 2000.

15. The method of claim 1, wherein component (b) comprises (v) the reaction product of a hydrocarbyl-substituted dicarboxylic acid or anhydride and an amine compound or salt which product comprises at least one amino triazole group.

16. The method of claim 1, which provides a score in a DW10C clean up test in excess of 9.8, when introduced to an engine having a merit score of less than 8.

* * * * *